US012676719B2

(12) United States Patent
Chen et al.

(10) Patent No.: US 12,676,719 B2
(45) Date of Patent: Jul. 7, 2026

(54) METHOD AND DEVICE FOR WIRELESS COMMUNICATION

(71) Applicant: Apogee 5g Global, LLC, Plano, TX (US)

(72) Inventors: Yu Chen, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 306 days.

(21) Appl. No.: 18/233,891

(22) Filed: Aug. 15, 2023

(65) Prior Publication Data

US 2024/0063967 A1 Feb. 22, 2024

(30) Foreign Application Priority Data

Aug. 17, 2022 (CN) .......................... 202210985187.X

(51) Int. Cl.
| | |
|---|---|
| *H04L 5/00* | (2006.01) |
| *H04B 17/318* | (2015.01) |
| *H04W 24/08* | (2009.01) |

(52) U.S. Cl.
CPC ......... H04L 5/0051 (2013.01); H04B 17/328 (2023.05); H04W 24/08 (2013.01)

(58) Field of Classification Search
CPC ..... H04W 24/08; H04W 24/06; H04W 24/10; H04L 5/0048; H04L 5/00; H04B 17/318; H04B 17/309
See application file for complete search history.

(56) References Cited

U.S. PATENT DOCUMENTS

| | | | |
|---|---|---|---|
| 9,992,695 B2 * | 6/2018 | Axmon | ................. H04W 24/10 |
| 11,902,033 B2 | 2/2024 | Deenoo et al. | |

(Continued)

FOREIGN PATENT DOCUMENTS

| | | |
|---|---|---|
| CN | 113312445 A | 8/2021 |
| CN | 114612741 A | 6/2022 |

(Continued)

OTHER PUBLICATIONS

Ericsson, "Miscellaneous non-controversial corrections Set IX," 3GPP TSG-RAN WG2 Meeting #113e, R2-2101286, Electronic Meeting (Jan. 25-Feb. 5, 2021).

(Continued)

*Primary Examiner* — Mong-Thuy T Tran
(74) *Attorney, Agent, or Firm* — Volpe Koenig

(57) ABSTRACT

The present application discloses a method and device for wireless communications, comprising receiving a first signaling, and the first signaling indicating a first RS resource set and a second RS resource set; executing a first link quality evaluation for a first BWP according to the first RS resource set; executing a second link quality evaluation for a first BWP according to the second RS resource set; wherein the first RS resource set and the second RS resource set are respectively associated with a first PCI and a second PCI; a first condition set is used for the first link quality evaluation, when all conditions in a first condition set are met, the first link quality evaluation is completed within a first evaluation period. The present application can better save power by controlling a first link quality evaluation and a second link quality evaluation.

20 Claims, 3 Drawing Sheets

100

(56) References Cited

U.S. PATENT DOCUMENTS

| | | | |
|---|---|---|---|
| 11,973,638 B2 | 4/2024 | Cirik et al. | |
| 2021/0091843 A1* | 3/2021 | Bai | H04W 76/19 |
| 2021/0167930 A1* | 6/2021 | Jeon | H04L 5/0098 |
| 2022/0116127 A1* | 4/2022 | Zhou | H04W 72/21 |
| 2022/0132517 A1* | 4/2022 | Zhu | H04L 5/0051 |
| 2024/0147273 A1* | 5/2024 | Li | H04W 24/08 |
| 2024/0224082 A1* | 7/2024 | Yang | H04W 24/04 |
| 2024/0236736 A1* | 7/2024 | Oh | H04W 8/22 |
| 2025/0048485 A1* | 2/2025 | Lei | H04W 76/40 |
| 2025/0105904 A1* | 3/2025 | Cirik | H04L 5/0094 |
| 2025/0330995 A1* | 10/2025 | Kim | H04W 72/23 |

FOREIGN PATENT DOCUMENTS

| | | | | |
|---|---|---|---|---|
| EP | 4311138 A1 * | 1/2024 | | H04L 1/0003 |
| WO | WO-2012093156 A1 * | 7/2012 | | H04W 72/541 |
| WO | 2014152069 A2 | 9/2014 | | |
| WO | 2020068472 A1 | 4/2020 | | |

OTHER PUBLICATIONS

Nokia et al., "Correction to TX resource pool sidelink mode 1 and 2 in 38.331 for V2X," 3GPP TSG-RAN WG2 Meeting #111 electronic, R2-2007198, online (Aug. 17-28, 2020).

* cited by examiner

100

First node

| Receiving first signaling | 101 |

Executing first link quality evaluation for first BWP according to first RS resource set — 102

Executing second link quality evaluation for first BWP according to second RS resource set — 103

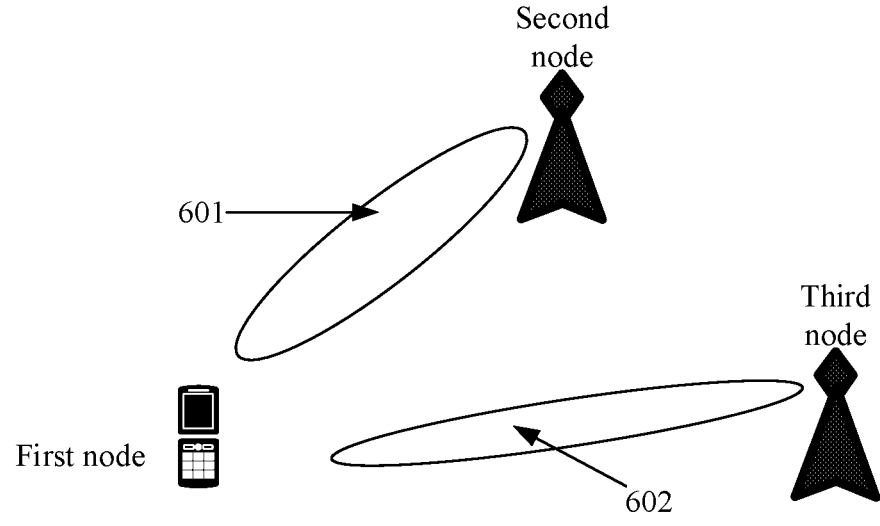

FIG. 6

A bit in first bitmap ←—being used to indicate—→ Whether first link quality evaluation is completed within first evaluation period or second evaluation period

FIG. 7

A bit in second bitmap ←—being used to indicate—→ Whether second link quality evaluation is completed within third evaluation period or fourth evaluation period

FIG. 8

Bit corresponding to first serving cell in third bitmap ←—being used to indicate—→ Target evaluation period

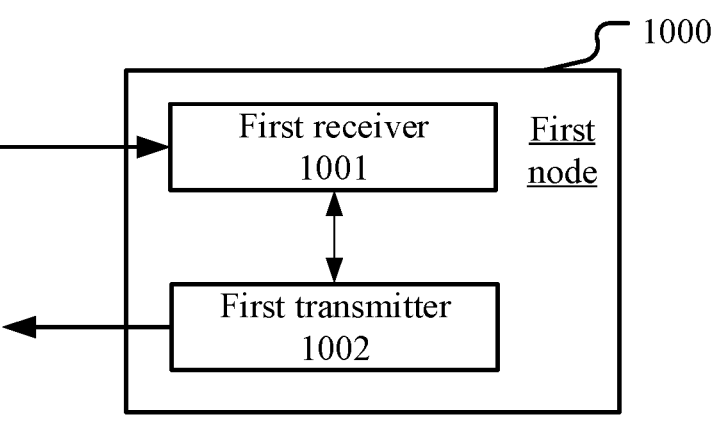

First node

First receiver 1001

First transmitter 1002

FIG. 10

METHOD AND DEVICE FOR WIRELESS COMMUNICATION

CROSS REFERENCE TO RELATED APPLICATIONS

This application claims the priority benefit of Chinese Patent Application No. 202210985187.X, filed on Aug. 17, 2022, the full disclosure of which is incorporated herein by reference.

BACKGROUND

Technical Field

The present application relates to transmission methods and devices in wireless communication systems, in particularly to measurement control for power saving.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In communications, whether Long Term Evolution (LTE) or 5G NR involves features of accurate reception of reliable information, optimized energy efficiency ratio, determination of information efficiency, flexible resource allocation, scalable system structure, efficient non-access layer information processing, low service interruption and dropping rate and support for low power consumption, which are of great significance to the maintenance of normal communications between abase station and a UE, reasonable scheduling of resources and balancing of system payload. Those features can be called the cornerstone of high throughout and are characterized in meeting communication requirements of various service, improving spectrum utilization and improving service quality, which are indispensable in enhanced Mobile BroadBand (eMBB), Ultra Reliable Low Latency Communications (URLLC) and enhanced Machine Type Communications (eMTC). Meanwhile, in the following communication modes, covering Industrial Internet of Things (IIoT), Vehicular to X (V2X), Device to Device communications, Unlicensed Spectrum communications, User communication quality monitoring, network planning optimization, Non-Territorial Networks (NTN), Territorial Networks (TN), and Dual connectivity system, there are extensive requirements in radio resource management and selection of multi-antenna codebooks as well as in signaling design, adjacent cell management, service management and beamforming. Transmission methods of information are divided into broadcast and unicast, both of which are essential for 5G system for that they are very helpful to meet the above requirements. The UE can be connected to the network directly or through a relay.

With the increase of scenarios and complexity of systems, higher requirements are raised for interruption rate and time delay reduction, reliability and system stability enhancement, service flexibility and power saving. At the same time, compatibility between different versions of different systems should be considered when designing the systems.

3GPP standardization organization has carried out relevant standardization work for 5G and formed a series of standards, which can be referred to as follows:

In communication systems, power control is a very important issue.

See Third Generation Partnership Project (3GPP) Technical Specification (TS) 38.213 Release 17.

See also 3GPP TS 38.331 Release 17.

SUMMARY

In a latest 3GPP research topic, the issue of power saving is involved. For a terminal, an important aspect of power consumption is performing measurement and link quality evaluation. In link quality evaluation, the terminal measures downlink reference signal resources and processes the measurement result to monitor link quality. When quality of the current link is found to be worse than a certain threshold, the terminal can take corresponding measures for improvement, such as notifying the network or selecting a better link for communications. If power saving and evaluation on link quality are both wanted, configuring an appropriate evaluation time can be considered. However, if the evaluation time is too long, it means that the decrease of the link quality will be detected for a long time, which may lead to communication quality degradation, dropped calls and other issues. In 3GPP R17 (Release 17), multiple Transmission-Reception Points (TRPs) were studied and standardized, further expanding the functions of the cell. In traditional communication networks, generally speaking, a cell can only manage and control its own spatial resources, which means that the UE's channel and transmission resources occupy spatial resources of its own cell, however, in R17, the UE can also occupy spatial resources associated with other Physical Cell Identities (PCIs), for example, these PCIs are mapped with synchronization signals of neighboring cells, which means that the serving cell can simultaneously control the spatial resources of its own cell and some other cells to serve specific users. In R17, these services are restrictive, that is, these additional or extra PCI-determined spatial resources only provide partial services, rather than complete cell services. Channels or bearers above a physical layer can be transmitted through multiple PCI-associated spatial links, ensuring the communication reliability or providing higher capacity based on different configurations, which is a very unique system architecture. How to evaluate the link quality of each PCI-associated link or resource, such as TRP, under such architecture, to save power while ensuring communication reliability is a problem to be solved.

To address the above problem, the present application provides a solution.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict. At the same time, the method proposed in the present application can also be used to solve other problems in communications.

The present application provides a method in a first node for wireless communications, comprising:

receiving a first signaling, the first signaling indicating a first RS resource set and a second RS resource set; and executing a first link quality evaluation for a first BWP according to the first RS resource set; executing a second link quality evaluation for a first BWP according to the second RS resource set;

herein, the first RS resource set and the second RS resource set are respectively associated with a first PCI and a second PCI; a first condition set is used for the first link quality evaluation, when all conditions in a first condition set are met, the first link quality evaluation is completed within a first evaluation period, and when at least one condition in the first condition set is not met, the first link quality evaluation is completed within a second evaluation period; a second condition set is used for the second link quality evaluation, when all conditions in a second condition set are met, the second link quality evaluation is completed within a third evaluation period, and when at least one condition in a second condition set is not met, the second link quality evaluation is completed within a fourth evaluation period; the first condition set comprises RSRP of at least the first RS resource set being greater than a first threshold; the second condition set comprises RSRP of at least the second RS resource set being greater than a second threshold.

In one embodiment, a problem to be solved in the present application comprises: how to save power, how to configure different evaluation periods, how to adopt corresponding quality evaluations for multiple TRPs, and how to ensure communication reliability.

In one embodiment, advantages of the above method comprise: being more power efficient and more flexible, ensuring communication quality, QoS and reliability, avoiding dropped calls, supporting multi-TRP communications, and supporting separate control for link quality evaluation of RS resource sets associated with different PCIs.

Specifically, according to one aspect of the present application, the first signaling is used to configure a first serving cell;

herein, the meaning of the phrase that the first signaling is used to configure a first serving cell comprises: the first serving cell is an SpCell, and an SpCellConfig field comprised in the first signaling is used to configure the first serving cell; the SpCellConfig field of the first signaling comprises the first PCI and the second PCI, or the first serving cell is an SCell, and an SCellConfig field comprised the first signaling comprises the first PCI and the second PCI; the first PCI is a PCI of the first serving cell; the second PCI is an additional PCI; there exists a mapping relation between only a former of the first PCI and the second PCI and a synchronization signal of the first serving cell.

Specifically, according to one aspect of the present application, the first condition set comprises not transmitting a beam failure instance indication based on the first RS resource set to higher layer; the first condition set is unrelated to whether to transmit a beam failure instance indication based on the second RS resource set to higher layer; the second condition set comprises not transmitting a beam failure instance indication based on the second RS resource set to higher layer; the second condition set is unrelated to whether to transmit a beam failure instance indication based on the first RS resource set to higher layer.

Specifically, according to one aspect of the present application, the first condition set comprises not transmitting a beam failure instance indication based on the first RS resource set or based on the second RS resource set to higher layer; the second condition set comprises not transmitting a beam failure instance indication based on the first RS resource set or based on the second RS resource set to higher layer.

Specifically, according to one aspect of the present application, a value of at least one of the third evaluation period or the fourth evaluation period is related to whether beam failure based on the first RS resource set occurs; when no beam failure occurs, the third evaluation period is equal to the first evaluation period, and the fourth evaluation period is equal to the second evaluation period.

Specifically, according to one aspect of the present application, the first condition set and the second condition set respectively comprise that a first timer corresponding to a cell group to which a first serving cell belongs is not running.

Specifically, according to one aspect of the present application, whether the first condition set comprises a condition of a first timer not being running is related to the first PCI.

Specifically, according to one aspect of the present application, only one of the first condition set and the second condition set comprises a condition of the first timer not being running.

Specifically, according to one aspect of the present application, a first message is transmitted, the first message comprises a first bitmap and a second bitmap, one bit in the first bitmap is used to indicate whether the first link quality evaluation is completed within the first evaluation period or the second evaluation period; a bit in the second bitmap is used to indicate whether the second link quality evaluation is completed within the third evaluation period or fourth evaluation period.

Specifically, according to one aspect of the present application, a link quality evaluation for a third RS resource set is completed within a target evaluation period;

a first message is transmitted;

herein, the first signaling indicates the third RS resource set, and the third RS resource set is used for a beam failure detection for the first serving cell; the first message comprises a third bitmap only assuming that the first RS resource set and the second RS resource set are not configured; bits corresponding to the first serving cell in the third bitmap are used to indicate the target evaluation period.

Specifically, according to one aspect of the present application, the first node is an IoT terminal.

Specifically, according to one aspect of the present application, the first node is a UE.

Specifically, according to one aspect of the present application, the first node is a relay.

Specifically, according to one aspect of the present application, the first node is an access network device.

Specifically, according to one aspect of the present application, the first node is a vehicle terminal.

Specifically, according to one aspect of the present application, the first node is an aircraft.

Specifically, according to one aspect of the present application, the first node is a mobile phone.

The present application provides a first node for wireless communications, comprising:

a first receiver, receiving a first signaling, the first signaling indicating a first RS resource set and a second RS resource set; and the first receiver, executing a first link quality evaluation for a first BWP according to the first RS resource set; executing a second link quality evaluation for a first BWP according to the second RS resource set;

herein, the first RS resource set and the second RS resource set are respectively associated with a first PCI and a second PCI; a first condition set is used for the first link quality evaluation, when all conditions in a first condition set are met, the first link quality evaluation is completed within a first evaluation period, and when at least one condition in the first condition set is not met, the first link quality evaluation is completed within a second evaluation period; a second condition set is used for the second link quality evaluation, when all conditions in a second condition set are met, the second link quality evaluation is completed within a third evaluation period, and when at least one condition in a second condition set is not met, the second link quality evaluation is completed within a fourth evaluation period; the first condition set comprises RSRP of at least the first RS resource set being greater than a first threshold; the second condition set comprises RSRP of at least the second RS resource set being greater than a second threshold.

In one embodiment, the present application has the following advantages over conventional schemes:

it can save power while ensuring communication reliability and QoS.

it can save power of the terminal.

it can save power of the network.

it can support link quality evaluation for multiple TRPs.

it can support various reference signals.

it can assist in further optimization of the network.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a schematic diagram of a reference signal according to one embodiment of the present application;

FIG. 7 illustrates a schematic diagram in which a bit in the first bitmap is used to indicate whether a first link quality evaluation is completed within a first evaluation period or within a second evaluation period according to one embodiment of the present application;

FIG. 8 illustrates a schematic diagram in which a bit in the second bitmap is used to indicate whether a second link quality evaluation is completed within a third evaluation period or a fourth evaluation period according to one embodiment of the present application;

FIG. 9 illustrates a schematic diagram in which bits corresponding to a first serving cell in a third bitmap are used to indicate a target evaluation period according to one embodiment of the present application;

FIG. 10 illustrates a schematic diagram of a processor in a first node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
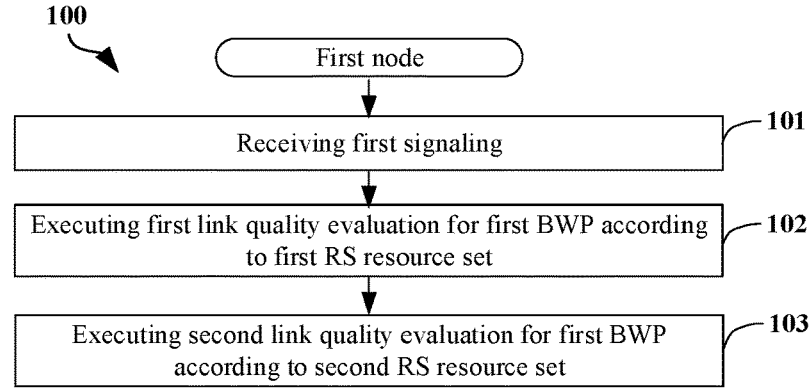
FIG. 1 illustrates a flowchart of receiving a first signaling, executing a first link quality evaluation for a first BWP according to the first RS resource set, and executing a second link quality evaluation for a first BWP according to a second RS resource set according to one embodiment of the present application.

Embodiment 1 illustrates a flowchart of receiving a first signaling, executing a first link quality evaluation for a first BWP according to a first RS resource set, and executing a second link quality evaluation for a first BWP based on a second RS resource set according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, a first node in the present application receives a first signaling in step 101; executes a first link quality evaluation for a first BWP according to a first RS resource set in step 102; executes a second link quality evaluation for a first BWP according to the second RS resource set in step 103;

herein, the first signaling indicates a first RS resource set and a second RS resource set; the first RS resource set and the second RS resource set are respectively associated with a first PCI and a second PCI; a first condition set is used for the first link quality evaluation, when all conditions in a first condition set are met, the first link quality evaluation is completed within a first evaluation period, and when at least one condition in the first condition set is not met, the first link quality evaluation is completed within a second evaluation period; a second condition set is used for the second link quality evaluation, when all conditions in a second condition set are met, the second link quality evaluation is completed within a third evaluation period, and when at least one condition in a second condition set is not met, the second link quality evaluation is completed within a fourth evaluation period; the first condition set comprises RSRP of at least the first RS resource set being greater than a first threshold; the second condition set comprises RSRP of at least the second RS resource set being greater than a second threshold.

In one embodiment, the first node is a User Equipment (UE).

In one embodiment, the first node is in RRC_CONNECTED state.

In one embodiment, a serving cell refers to a cell where a UE camps. Executing a cell search comprises: a UE searches for a suitable cell of a selected Public Land Mobile Network (PLMN) or a Stand-alone Non-Public Network (SNPN), selects the suitable cell to provide available traffic, and monitors a control channel of the suitable cell, and this procedure is defined as camping on a cell; that is to say, a camped cell is a serving cell of the UE relative to the UE. It has the following advantages to camp on a cell in RRC idle state or RRC inactive state: enabling the UE to receive a system message from a PLMN or an SNPN; after registration, if the UE wishes to establish an RRC connection or continue a suspended RRC connection, the UE can achieve this by executing an initial access on a control channel of the camping cell; the network may page the UE, which enables the UE to receive Earthquake and Tsunami Warning System (ETWS) and Commercial Mobile Alert System (CMAS) notifications.

In one embodiment, for a UE in RRC_CONNECTED state not configured with carrier aggregation/dual connectivity (CA/DC), only one serving cell comprises a primary cell. For a UE in RRC_CONNECTED state configured with carrier aggregation/dual connectivity (CA/DC), a serving cell is used to indicate a cell set comprising a Special Cell (SpCell) and all sub-cells. A Primary Cell is a Master Cell Group (MCG) cell, which works at primary frequency, and the UE executes an initial connection establishment procedure or initiates a connection re-establishment on a primary cell. For dual connectivity operation, a special cell refers to a Primary Cell (PCell) of an MCG or a Primary SCG Cell (PSCell) of an SCG; if it is not a dual connectivity operation, an SpCell refers to a PCell.

In one embodiment, a frequency at which a Secondary Cell (SCell) works is sub-frequency.

In one embodiment, individual content of an information element is called a field.

In one embodiment, a Multi-Radio Dual Connectivity (MR-DC) refers to a dual connectivity between an E-UTRA and an NR node, or a dual connectivity between two NR nodes.

In one embodiment, in MR-DC, a radio access node providing a control-plane connection to the core network is a master node, the master node may be a master eNB, a master ng-eNB, or a master gNB.

In one embodiment, an MCG refers to, in MR-DC, a group of serving cells associated with a master node, comprising an SpCell, and optionally one or multiple SCells.

In one embodiment, a PCell is an SpCell of an MCG.

In one embodiment, a PSCell is an SpCell of an SCG.

In one embodiment, in MR-DC, a radio access node not providing control plane connectivity to the core network and providing extra resources to a UE is a secondary node; the secondary node can be an en-gNB, a secondary ng-eNB or a secondary gNB.

In one embodiment, in MR-DC, a group of serving cells associated with a secondary node is a Secondary Cell Group (SCG), comprising an SpCell and optionally, one or multiple SCells.

In one embodiment, a TRP is associated with a PCI.

In one embodiment, a TRP is determined by at least one spatial parameter.

In one embodiment, a TRP is determined by at least one reference signal resource.

In one embodiment, a TRP is associated with at least one TCI-state parameter.

In one embodiment, the first signaling comprises an RRC message.

In one embodiment, the first signaling comprises an RRCReconfiguration message.

In one embodiment, the first signaling comprises BeamFailureRecoveryServingCellConfig.

In one embodiment, BeamFailureRecoveryServingCellConfig comprised in the first signaling respectively indicate a candidate beam reference signal list for a first RS resource set and a candidate beam reference signal list for a second RS resource set.

In one embodiment, the first signaling comprises the candidateBeamRSList, and the candidateBeamRSList indicates a candidate beam reference signal list for a first RS resource set.

In one embodiment, the first signaling comprises the candidateBeamRSList2, and the candidateBeamRSList2 indicates a candidate beam reference signal list for a first RS resource set.

In one embodiment, the first signaling explicitly comprises a first RS resource set.

In one embodiment, the first signaling explicitly comprises a second RS resource set.

In one embodiment, the first RS resource set comprises at least one reference signal (RS) resource.

In one embodiment, the first RS resource set comprises an SSB.

In one embodiment, the first RS resource set comprises a CSI-RS.

In one embodiment, the first RS resource set only comprises a CSI-RS.

In one embodiment, the first RS resource set comprises a PRS.

In one embodiment, the first RS resource set does not comprise a PRS.

In one embodiment, the second RS resource set comprises at one RS resource.

In one embodiment, the second RS resource set comprises an SSB.

In one embodiment, the second RS resource set comprises a CSI-RS.

In one embodiment, the second RS resource set comprises a PRS.

In one embodiment, the second RS resource set does not comprise a PRS.

In one embodiment, the second RS resource set only comprises a CSI-RS.

In one embodiment, a serving cell of the first node configures the first RS resource set through broadcast.

In one embodiment, a serving cell of the first node configures the first RS resource set through unicast.

In one embodiment, a serving cell of the first node configures the second RS resource set through broadcast.

In one embodiment, a serving cell of the first node configures the second RS resource set through unicast.

In one embodiment, the first RS resource set is or corresponds to $\bar{q}_{0,0}$.

In one embodiment, the first RS resource set is a BFD-RS set.

In one embodiment, the second RS resource set is or corresponds to $\bar{q}_{0,1}$.

In one embodiment, the second RS resource set is a BFD-RS set.

In one embodiment, the first RS resource set corresponds to a TRP.

In one embodiment, the second RS resource set corresponds to a TRP.

In one embodiment, the first signaling comprises RadioLinkMonitoringConfig.

In one embodiment, RadioLinkMonitoringConfig comprised in the first signaling is used to configure the first RS resource set and the second RS resource set.

In one embodiment, failureDetectionSet1 in RadioLinkMonitoringConfig comprised in the first signaling indicates the first RS resource set.

In one embodiment, failureDetectionSet2 in RadioLinkMonitoringConfig comprised in the first signaling indicates the second RS resource set.

In one embodiment, the first signaling indicates an identity of the first RS resource set.

In one embodiment, the first signaling indicates an identity of the second RS resource set.

In one embodiment, the first signaling indicates a maximum count of beam failure instances for the first RS resource set.

In one embodiment, the first signaling indicates a maximum count of beam failure instances for the second RS resource set.

In one embodiment, the first signaling configures a beam failure detection timer for the first RS resource set.

In one embodiment, the first signaling configures a beam failure detection timer for the second RS resource set.

In one embodiment, the first link quality evaluation comprises: beam failure detection.

In one embodiment, the second link quality evaluation comprises: beam failure detection.

In one embodiment, the first link quality evaluation comprises: evaluating whether RSRP of the first RS resource set is worse than a specific threshold.

In one embodiment, the second link quality evaluation comprises: evaluating whether RSRP of the second RS resource set is worse than a specific threshold.

In one embodiment, the first link quality evaluation comprises: evaluating whether quality of a link targeted by the first RS resource set is worse than a specific threshold.

In one embodiment, the first link quality evaluation comprises: evaluating whether a link corresponding to or determined by the first RS resource set has beam failure.

In one embodiment, the first link quality evaluation comprises: evaluating whether a link corresponding to or determined by the first RS resource set has radio link failure.

In one embodiment, the second link quality evaluation comprises: evaluating whether quality of a link targeted by the second RS resource set is worse than a specific threshold.

In one embodiment, the second link quality evaluation comprises: evaluating whether a link corresponding to or determined by the second RS resource set has beam failure.

In one embodiment, the second link quality evaluation comprises: evaluating whether a link corresponding to or determined by the second RS resource set has radio link failure.

In one embodiment, the specific threshold is configured by a serving cell.

In one embodiment, the specific threshold is configured by network.

In one embodiment, the specific threshold is a fixed value.

In one embodiment, the specific threshold is determined by the first node based on an internal algorithm.

In one embodiment, the specific threshold is $Q_{out,LR}$.

In one embodiment, the first link quality evaluation comprises: measuring RSRP on the first RS resource set and comparing a measurement result with a specific threshold.

In one embodiment, the first link quality evaluation comprises: measuring RSRP on the first RS resource set and evaluating whether a measurement result is worse than a specific threshold.

In one embodiment, the second link quality evaluation comprises: measuring RSRP on a second RS resource set and comparing a measurement result with a specific threshold.

In one embodiment, the second link quality evaluation comprises: measuring RSRP on a second RS resource set and evaluating whether a measurement result is worse than a specific threshold.

In one embodiment, the SpCell is or comprises a PCell.

In one embodiment, the SpCell is or comprises a PSCell.

In one embodiment, a transmitter of the first signaling is a serving cell of the first node.

In one embodiment, a transmitter of the first signaling is an SpCell of the first node.

In one embodiment, a transmitter of the first signaling is an SCell of the first node.

In one embodiment, the first RS resource set is associated with a first PCI.

In one embodiment, the second RS resource set is associated with a second PCI.

In one embodiment, the second PCI is an additional PCI.

In one embodiment, the second PCI belongs to an additional SSB.

In one embodiment, a serving cell of the first node is configured with an additionalPCIList.

In one embodiment, an additionalPCI field comprised in the first signaling indicates the second PCI.

In one embodiment, the first signaling explicitly indicates a PCI associated with the second RS resource set.

In one embodiment, the meaning of the phrase that the first RS resource set is associated with a first PCI is: the first signaling does not indicate that the first RS resource set is associated with an additionalPCI.

In one embodiment, the meaning of the phrase that the first RS resource set is associated with a first PCI is: there exists a quasi-co-located relation between the first RS resource set and an RS resource associated with the first PCI.

In one embodiment, the meaning of the phrase that the first RS resource set is associated with a first PCI is: there exists a quasi-co-located relation between the first RS resource set and an SSB or a CSI-RS associated with the first PCI.

In one embodiment, the meaning of the phrase that the first RS resource set is associated with a first PCI is: any RS resource in the first RS resource set is associated with the first PCI.

In one embodiment, the meaning of the phrase that the first RS resource set is associated with a first PCI is: a TCI-state of any RS resource in the first RS resource set comprises the first PCI.

In one embodiment, the meaning of the phrase that the first RS resource set is associated with a first PCI is: a TCI-state of any RS resource in the first RS resource set has an associated relation with the first PCI.

In one embodiment, the meaning of the phrase that the second RS resource set is associated with a second PCI is: any RS resource in the second RS resource set is associated with the second PCI.

In one embodiment, the meaning of the phrase that the first RS resource set is associated with a first PCI is: the first PCI is indicated by a physCellId of ServingCellConfigCommon comprised in the first signaling, and the first RS resource set is $\bar{q}_{0,0}$.

In one embodiment, the meaning of the phrase that the second RS resource set is associated with a second PCI is: the second PCI is indicated by a physical cell identity other than a physCellId of ServingCellConfigCommon comprised in the first signaling, and the second RS resource set is $\bar{q}_{0,1}$.

In one embodiment, the first PCI is indicated by a physCellId of ServingCellConfigCommon comprised in the first signaling.

In one embodiment, the first PCI is a PCI of a serving cell of the first node.

In one embodiment, the serving cell of the first node is a transmitter of the first signaling.

In one embodiment, the first PCI is an additionalPCI.

In one embodiment, any RS in the first RS resource set is transmitted by the first serving cell, and the first signaling is comprised or transmitted by the first serving cell.

In one embodiment, any RS in the second RS resource set is transmitted by the first serving cell, and the first signaling is comprised or transmitted by the first serving cell.

In one embodiment, any RS in the first RS resource set is transmitted by the first serving cell, and a serving cell comprised or configured in the first signaling is the first serving cell.

In one embodiment, any two RSs in the first RS resource set are transmitted by the first serving cell, and a serving cell comprised or configured in the first signaling is the first serving cell.

In one embodiment, the first signaling comprises or configures an SSB-MTCAdditionalPCI.

In one embodiment, the first signaling comprises or configures an SSB-MTC-AdditionalPCI.

In one embodiment, an SSB-MTC-AdditionalPCI is equivalent to an SSB-MTCAdditionalPCI.

In one embodiment, the SSB-MTC-AdditionalPCI is used to configure timing information of an additional SSB, and the PCI of the additional SSB is different from a PCI of a serving cell.

In one embodiment, the first BWP is any BWP of a first serving cell.

In one embodiment, the first BWP is a downlink BWP.

In one embodiment, the first BWP is an active BWP.

In one embodiment, the first BWP is a BWP of a first serving cell.

In one embodiment, the first RS resource set is an RS resource set on the first BWP.

In one embodiment, the second RS resource set is an RS resource set on the first BWP.

In one embodiment, the first evaluation period is $T_{Evaluation\_BFD\_SSB\_Relax}$.

In one embodiment, the second evaluation period is $T_{Evaluate\_BFD\_SSB}$.

In one embodiment, the first evaluation period is $T_{Evaluate\_BFD\_CSI-RS\_Relax}$.

In one embodiment, the second evaluation period is $T_{Evaluate\_BFD\_CSI-RS}$.

In one embodiment, the third evaluation period is $T_{Evaluation\_BFD\_SSB\_Relax}$.

In one embodiment, the fourth evaluation period is $T_{Evaluate\_BFD\_SSB}$.

In one embodiment, the third evaluation period is $T_{Evaluate\_BFD\_CSI-RS\_Relax}$.

In one embodiment, the fourth evaluation period is $T_{Evaluate\_BFD\_CSI-RS}$.

In one embodiment, the first evaluation period is represented by $T_{Evaluate\_BFD\_SSB\_Relax}$.

In one embodiment, the first evaluation period is represented by $T_{Evaluate\_BFD\_SSB}$.

In one embodiment, the first evaluation period is represented by $T_{Evaluate\_BFD\_CSI-RS\_Relax}$.

In one embodiment, the second evaluation period is represented by $T_{Evaluate\_BFD\_CSI-RS}$.

In one embodiment, the third evaluation period is represented by $T_{Evaluate\_BFD\_SSB\_Relax}$.

In one embodiment, the fourth evaluation period is represented by $T_{Evaluate\_BFD\_SSB}$.

In one embodiment, the third evaluation period is represented by $T_{Evaluate\_BFD\_CSI-RS\_Relax}$.

In one embodiment, the fourth evaluation period is represented by $T_{Evaluate\_BFD\_CSI-RS}$.

In one embodiment, the first evaluation period and the third evaluation period are variables with a same name that take values separately.

In one embodiment, the second evaluation period and the fourth evaluation period are variables with a same name that take values separately.

In one embodiment, the meaning of the phrase of completing the first link quality evaluation within a first evaluation period comprises: the first node has the capability to complete a first link quality evaluation within the first evaluation period.

In one embodiment, the meaning of the phrase of completing the first link quality evaluation within a first evaluation period comprises: link quality is generated for a measurement result during a time period determined by a previous first evaluation period.

In one embodiment, the meaning of the phrase of completing the first link quality evaluation within a first evaluation period comprises: the first node has the capability to determine whether radio link targeted by a first link quality evaluation has beam failure within the first evaluation period.

In one embodiment, the meaning of the phrase of completing the second link quality evaluation within a third evaluation period comprises: the first node has the capability to complete the second link quality evaluation within a third evaluation period.

In one embodiment, the meaning of the phrase of completing the second link quality evaluation within a third evaluation period comprises: link quality is generated for a measurement result during a time period determined by a previous third evaluation period.

In one embodiment, the meaning of the phrase of completing the second link quality evaluation within a third evaluation period comprises: the first node has the capability to determine whether radio link targeted by a second link quality evaluation has beam failure within the third evaluation period.

In one embodiment, the meaning of the phrase of completing the first link quality evaluation within a second evaluation period comprises: the first node has the capability to complete a first link quality evaluation within the second evaluation period.

In one embodiment, the meaning of the phrase of completing the first link quality evaluation within a second evaluation period comprises: link quality is generated for a measurement result during a time period determined by a previous second evaluation period.

In one embodiment, the meaning of the phrase of completing the first link quality evaluation within a second evaluation period comprises: the first node has the capability to determine whether radio link targeted by a first link quality evaluation has beam failure within the second evaluation period.

In one embodiment, the meaning of the phrase of completing the second link quality evaluation within a fourth evaluation period comprises: the first node has the capability to complete the second link quality evaluation within a fourth evaluation period.

In one embodiment, the meaning of the phrase of completing the second link quality evaluation within a fourth evaluation period comprises: link quality is generated based on a measurement result during a time period determined for a previous fourth evaluation period.

In one embodiment, the meaning of the phrase of completing the second link quality evaluation within a fourth evaluation period comprises: the first node has the capability to determine whether radio link targeted by a second link quality evaluation has beam failure within the fourth evaluation period.

In one embodiment, a result of the first link quality evaluation comprises being worse than or not worse than a specific threshold.

In one embodiment, a result of the second link quality evaluation comprises being worse than or not worse than a specific threshold.

In one embodiment, the first evaluation period is equal to the third evaluation period.

In one embodiment, the first evaluation period is not equal to the third evaluation period.

In one embodiment, the second evaluation period is equal to the fourth evaluation period.

In one embodiment, the second evaluation period is not equal to the fourth evaluation period.

In one embodiment, whether the first evaluation period is equal to the third evaluation period is related to whether beam failure occurs.

In one embodiment, whether the second evaluation period is equal to the fourth evaluation period is related to whether beam failure occurs.

In one embodiment, when a result of the first link quality evaluation and a result of the second link quality evaluation are not less than a specific threshold, the first evaluation period is equal to the third evaluation period.

In one embodiment, when a result of the first link quality evaluation and a result of the second link quality evaluation are not less than a specific threshold, the second evaluation period is equal to the fourth evaluation period.

In one embodiment, when a link targeted by the first link quality evaluation has no beam failure and a link targeted by the second link quality evaluation has no beam failure, the first evaluation period is equal to the third evaluation period.

In one embodiment, when a link targeted by the first link quality evaluation has no beam failure and a link targeted by the second link quality evaluation has no beam failure, the second evaluation period is equal to the fourth evaluation period.

In one embodiment, the first evaluation period is not equal to the second evaluation period.

In one embodiment, the second evaluation period is not equal to the fourth evaluation period.

In one embodiment, a DRX cycle is less than or equal to 80 ms.

In one embodiment, a DRX cycle is less than or equal to 160 ms.

In one embodiment, a DRX period configured to the first node is less than or equal to 80 ms.

In one embodiment, a DRX period configured to the first node is less than or equal to 160 ms.

In one embodiment, the first node is configured with a DRX.

In one embodiment, the first evaluation period is longer than the second evaluation period.

In one embodiment, the third evaluation period is longer than the fourth evaluation period.

In one embodiment, for a same DRX cycle, the first evaluation period is longer than the second evaluation period.

In one embodiment, for a same DRX cycle, the third evaluation period is longer than the fourth evaluation period.

In one embodiment, both the first evaluation period and the second evaluation period do not require an explicit signaling indication.

In one embodiment, both the third evaluation period and the second evaluation period do not require an explicit signaling indication.

In one embodiment, RSRP of the first RS resource set is RSRP obtained by measuring the first RS resource set.

In one embodiment, RSRP of the first RS resource set is RSRP obtained by measuring RS resources in the first RS resource set.

In one embodiment, RSRP of the first RS resource set is L1-RSRP obtained by measuring RS resources in the first RS resource set.

In one embodiment, RSRP of the second RS resource set is RSRP obtained by measuring the second RS resource set.

In one embodiment, RSRP of the second RS resource set is RSRP obtained by measuring RS resources in the second RS resource set.

In one embodiment, RSRP of the second RS resource set is L1-RSRP obtained by measuring RS resources in the second RS resource set.

In one embodiment, the first signaling is used to indicate a first offset, and the first offset is used to determine the first threshold.

In one embodiment, the first signaling is used to indicate a second offset, and the second offset is used to determine the first threshold.

In one embodiment, the first offset and the second offset are equal.

In one embodiment, a goodServingCellEvaluationBFD field comprised in the first signaling is used to determine the first threshold.

In one embodiment, a goodServingCellEvaluationBFD field comprised in the first signaling is used to determine the second threshold.

In one embodiment, the first threshold is equal to the second threshold.

In one embodiment, the first threshold is not equal to the second threshold.

In one embodiment, the first threshold is equal to $Q_{in}+X$, where X represents the first offset.

In one embodiment, the second threshold is equal to $Q_{in}+X1$, where X1 represents the second offset.

In one embodiment, $Q_{in}$ is $Q_{in,LR}$.

In one embodiment, the first signaling is used to indicate $Q_{in}$.

In one embodiment, when configuration indexes of the first RS resource set and the second RS resource set are required to be delivered to higher layer, the provided corresponding L1-RSRP measurements are L1-RSRP of these measurements equal to or greater than L1-RSRP of $Q_{in,LR}$.

In one embodiment, both the first RS resource set and the second RS resource set are for FR1.

In one embodiment, both the first RS resource set and the second RS resource set are for FR2.

In one embodiment, the first RS resource set is used for beam failure detection.

In one embodiment, the second RS resource set is used for beam failure detection.

In one embodiment, the first RS resource set and the second RS resource set are always configured in pairs.

In one embodiment, the first evaluation period satisfies $Max(50 \times K3, \ Ceil(7.5 \times K1 \times P) \times Max(T_{DRX}, T_{SSB}))$, where Max( ) is the function taking a maximum value, Ceil( ) is the function rounding up a value to an integer, P is a parameter related to a measurement gap, and $T_{DRX}$ is a DRX cycle.

In one subembodiment of the above embodiment, $T_{SSB}$ is a period of an SSB.

In one subembodiment of the above embodiment, $T_{SSB}$ is a period of an SSB in the second RS resource set.

In one subembodiment of the above embodiment, the $T_{SSB}$ is a resource period of an SSB in the second RS resource set.

In one subembodiment of the above embodiment, K1 is equal to 2 or 4.

In one subembodiment of the above embodiment, K3 is equal to 1 or K1.

In one subembodiment of the above embodiment, K3 is related to a value of K1, and when K1 is greater than 1 and less than or equal to 2, K3 is equal to K1; when K1 is greater than 2, K3 is equal to 1.

In one subembodiment of the above embodiment, a value of K1 is related to a value of Max ($T_{DRX}$, $T_{SSB}$).

In one subembodiment of the above embodiment, when a value of Max ($T_{DRX}$, $T_{SSB}$) is less than or equal to 40 ms, a value of K1 is 2.

In one subembodiment of the above embodiment, when a value of Max ($T_{DRX}$, $T_{SSB}$) is greater than 40 ms and less than or equal to 80 ms, a value of K1 is 4.

In one subembodiment of the above embodiment, a value of Max ($T_{DRX}$, $T_{SSB}$) is less than or equal to 80 ms.

In one subembodiment of the above embodiment, working frequency is FR1.

In one embodiment, the second evaluation cycle is related to a DRX cycle.

In one embodiment, the second evaluation period satisfies Max(50, Ceil($5 \times P$)$\times T_{SSB}$), where Max( ) is the function taking a maximum value, Ceil(is the function rounding up a value to an integer, P is a parameter related to a measurement gap, and the first node does not use DRX.

In one subembodiment of the above embodiment, $T_{SSB}$ is a period of an SSB.

In one subembodiment of the above embodiment, the $T_{SSB}$ is a period of an SSB in the second RS resource set.

In one subembodiment of the above embodiment, the $T_{SSB}$ is a resource period of an SSB in the second RS resource set.

In one subembodiment of the above embodiment, working frequency is FR1.

In one embodiment, the second evaluation period satisfies Max(50, Ceil($7.5 \times P$)$\times$Max($T_{DRX}$,$T_{SSB}$)), where Max( ) is the function taking a maximum value, Ceil( ) is the function rounding up a value to an integer, P is a parameter related to a measurement gap, $T_{SSB}$ is a period of SSB, and $T_{DRX}$ is a DRX period.

In one subembodiment of the above embodiment, the $T_{SSB}$ is a period of an SSB in the second RS resource set.

In one subembodiment of the above embodiment, working frequency is FR1.

In one subembodiment of the embodiment, a DRX period is less than or equal to 320 ms.

In one embodiment, the method proposed in the present application is applicable to FR1 and FR2.

In one embodiment, the first evaluation period satisfies Max($50 \times K3$, Ceil($K1 \times 1.5 \times M_{BFD} \times P \times P_{BFD}$)$\times$Max($T_{DRX}$, $T_{CSI\text{-}RS}$)), where Max( ) is the function taking a maximum value, Ceil( ) is the function rounding up a value to an integer, P is a parameter related to a measurement gap, and $T_{DRX}$ is a DRX cycle.

In one subembodiment of the above embodiment, $T_{CSI\text{-}RS}$ is a period of a CSI-RS.

In one subembodiment of the above embodiment, the $T_{CSI\text{-}RS}$ is a period of a CSI-RS in the second RS resource set.

In one subembodiment of the above embodiment, the $T_{CSI\text{-}RS}$ is a resource period of a CSI-RS in the second RS resource set.

In one subembodiment of the above embodiment, K1 is equal to 2 or 4.

In one subembodiment of the above embodiment, K3 is equal to 1 or K1.

In one subembodiment of the above embodiment, K3 is related to a value of K1, and when K1 is greater than 1 and less than or equal to 2, K3 is equal to K1; when K1 is greater than 2, K3 is equal to 1.

In one subembodiment of the above embodiment, a value of K1 is related to a value of Max ($T_{DRX}$, $T_{CSI\text{-}RS}$).

In one subembodiment of the above embodiment, when a value of Max ($T_{DRX}$, $T_{CSI\text{-}RS}$) is less than or equal to 40 ms, a value of K1 is 2.

In one subembodiment of the above embodiment, when a value of Max ($T_{DRX}$, $T_{CSI\text{-}RS}$) is greater than 40 ms and less than or equal to 80 ms, a value of K1 is 4.

In one subembodiment of the above embodiment, a value of Max ($T_{DRX}$, $T_{CSI\text{-}RS}$) is less than or equal to 80 ms.

In one subembodiment of the above embodiment, working frequency is FR1.

In one subembodiment of the above embodiment, $P_{BFD}$=1.

In one subembodiment of the above embodiment, for a PCell in NR-DC, a PCell or a PSCell in EN-DC or NE-DC or SA, $P_{BFD}$=1.

In one subembodiment of the above embodiment, if a BFD of an SCell is configured, $P_{BFD}$=2 or a multiple of 2.

In one subembodiment of the above embodiment, a typical value of $M_{BFD}$ is 10.

In one subembodiment of the above embodiment, when a bandwidth is greater than 24 physical resource blocks (PRBs), a density of reference signal resources used for BFD is equal to 3, and a value of the $M_{BFD}$ is 10.

In one embodiment, the first signaling is used to configure a first serving cell.

In one subembodiment of the above embodiment, a cell configured by ServingCellConfigCommon comprised in the first signaling is the first serving cell.

In one subembodiment of the above embodiment, a physCellId of ServingCellConfigCommon comprised in the first signaling is a PCI of the first serving cell.

In one subembodiment of the above embodiment, a cell configured by ServingCellConfig comprised in the first signaling is the first serving cell.

In one embodiment, the meaning of the phrase that the first signaling is used to configure a first serving cell comprises: the first serving cell is an SpCell, and an SpCellConfig field comprised in the first signaling is used to configure the first serving cell; the SpCellConfig field of the first signaling comprises the first PCI and the second PCI.

In one subembodiment of the above embodiment, spCellConfigCommon in reconfigurationWithSync comprised in the SpCellConfig field of the first signaling comprises the first PCI; additionalPCIList in the spCellConfigDedicated comprised in the SpCellConfig field of the first signaling comprises the second PCI.

In one embodiment, the meaning of the phrase that the first signaling is used to configure a first serving cell comprises: the first serving cell is an SCell, and an SCellConfig field comprised in the first signaling comprises the first PCI and the second PCI.

In one subembodiment of the above embodiment, an sCellConfigCommon field in SCellConfig comprised in the first signaling comprises the first PCI; an sCellConfigDedicated field in SCellConfig comprised in the first signaling comprises the second PCI.

In one embodiment, the first PCI is a PCI of the first serving cell.

In one embodiment, the second PCI is an additional PCI.

In one embodiment, an additional PCI is a PCI other than a PCI of a serving cell.

In one embodiment, there exists a mapping relation between only a former of the first PCI and the second PCI and a synchronization signal of the first serving cell.

In one embodiment, the first PCI has a mapping relation with a synchronization signal in an SSB of the first serving cell.

In one embodiment, the first PCI has a mapping relation with a main synchronization signal of the first serving cell.

In one embodiment, the first PCI has a mapping relation with a secondary synchronization signal of the first serving cell.

In one embodiment, a main synchronization signal and a secondary synchronization signal of the first serving cell have a mapping relation with the first PCI.

In one embodiment, the first condition set comprises not transmitting a beam failure instance indication based on the first RS resource set to higher layer.

In one subembodiment of the embodiment, a measurement according to the first RS resource set is used to determine beam failure.

In one subembodiment of the embodiment, a beam failure instance occurs when a measurement result according to the first RS resource set is worse than a specific threshold.

In one subembodiment of the embodiment, not transmitting a beam failure instance indication based on the first RS resource set to higher layer means that no beam failure occurs.

In one subembodiment of the embodiment, not transmitting a beam failure instance indication based on the first RS resource set to higher layer means that a measurement according to the first RS resource set is always not less than a specific threshold.

In one subembodiment of the embodiment, not transmitting a beam failure instance indication based on the first RS resource set to higher layer means that quality of a beam determined by the first RS resource set meets the requirements.

In one subembodiment of the embodiment, the meaning of the phrase of not transmitting a beam failure instance indication based on the first RS resource set to higher layer is that a value of BFI_COUNTER corresponding to the first RS resource set is 0.

In one embodiment, the first condition set is unrelated to whether to transmit a beam failure instance indication based on the second RS resource set to higher layer.

In one subembodiment of the embodiment, a measurement based on the second RS resource set is used to determine beam failure.

In one subembodiment of the embodiment, a beam failure instance occurs when a measurement result based on the second RS resource set is worse than a specific threshold.

In one subembodiment of the embodiment, the first condition set is unrelated to whether beam failure occurs on a link targeted or determined by the second RS resource set.

In one subembodiment of the embodiment, the meaning of the phrase that the first condition set is unrelated to whether to transmit a beam failure instance indication based on the second RS resource set to higher layer is unrelated to a value of BFI_COUNTER corresponding to the first condition set and the second RS resource set.

In one embodiment, the second condition set comprises not transmitting a beam failure instance indication based on the second RS resource set to higher layer.

In one subembodiment of the embodiment, a measurement based on the second RS resource set is used to determine beam failure.

In one subembodiment of the embodiment, a beam failure instance occurs when a measurement result based on the second RS resource set is worse than a specific threshold.

In one subembodiment of the embodiment, failure to transmit a beam failure instance indication based on the second RS resource set to higher layer means that no beam failure occurs.

In one subembodiment of the embodiment, failure to transmit a beam failure instance indication based on the second RS resource set to higher layer means that a measurement based on the second RS resource set is always no less than a specific threshold.

In one subembodiment of the embodiment, failure to transmit a beam failure instance indication based on the second RS resource set to higher layer means that quality of a beam determined by the second RS resource set meets the requirements.

In one subembodiment of the embodiment, the meaning of the phrase of failure to transmit a beam failure instance indication based on the second RS resource set to higher layer is that a value of BFI_COUNTER corresponding to the second RS resource set is 0.

In one embodiment, the second condition set is unrelated to whether to transmit a beam failure instance indication based on the first RS resource set to higher layer.

In one subembodiment of the embodiment, a measurement according to the first RS resource set is used to determine beam failure.

In one subembodiment of the embodiment, a beam failure instance occurs when a measurement result according to the first RS resource set is worse than a specific threshold.

In one subembodiment of the embodiment, the second condition set is unrelated to whether a link targeted or determined by the first RS resource set has beam failure.

In one subembodiment of the embodiment, the meaning of the phrase that the second condition set is unrelated to whether to transmit to higher layer a beam failure instance indication based on the first RS resource set is being unrelated to the second condition set and a value of BFI_COUNTER corresponding to the first RS resource set.

In one embodiment, the higher layer receives N beam failure instances before a timer for beam failure recovery expires, then beam failure recovery is triggered, N is a positive integer configured by the network, and an expiration value of the timer for beam failure recovery is also configured by the network.

In one embodiment, the higher layer comprises one of the MAC layer, the RRC layer, and the NAS layer.

In one embodiment, the higher layer is the MAC layer.

In one embodiment, the first condition set comprises beam failure recovery that has not occurred on a link targeted or determined by the first RS resource set; the first condition set is unrelated to beam failure recovery that has not occurred on a link targeted or determined by the second RS resource set.

In one embodiment, the second condition set comprises beam failure recovery that has not occurred on a link targeted or determined by the second RS resource set; the second condition set is unrelated to beam failure recovery that has not occurred on a link targeted or determined by the first RS resource set.

In one embodiment, the first condition set comprises not transmitting a beam failure instance indication based on the first RS resource set or based on the second RS resource set to higher layer.

In one subembodiment of the embodiment, the meaning of the phrase that the first condition set comprises not transmitting a beam failure instance indication based on the first RS resource set or based on the second RS resource set to higher layer is: a first condition set comprises not transmitting a beam failure instance indication based on the first RS resource set to higher layer; a first condition set comprises not transmitting a beam failure instance indication based on the second RS resource set to higher layer.

In one subembodiment of the embodiment, the meaning of the phrase that the first condition set comprises not transmitting a beam failure instance indication based on the first RS resource set or based on the second RS resource set to higher layer is: a first condition set comprises BFI_COUNTER associated with the first RS resource set with a value of 0, and a first condition set comprises BFI_COUNTER associated with the second RS resource set with a value of 0.

In one embodiment, the second condition set comprises not transmitting a beam failure instance indication based on the first RS resource set or based on the second RS resource set to higher layer.

In one subembodiment of the embodiment, the meaning of the phrase that the second condition set comprises not transmitting a beam failure instance indication based on the first RS resource set or based on the second RS resource set to higher layer is: a second condition set comprises not transmitting a beam failure instance indication based on the first RS resource set to higher layer; a second condition set comprises not transmitting a beam failure instance indication based on the second RS resource set to higher layer.

In one subembodiment of the embodiment, the meaning of the phrase that the second condition set comprises not transmitting a beam failure instance indication based on the first RS resource set or based on the second RS resource set to higher layer is: a second condition set comprises BFI_COUNTER associated with the first RS resource set with a value of 0, and a second condition set comprises BFI_COUNTER associated with the second RS resource set with a value of 0.

In one embodiment, a first condition set comprises BFI_COUNTER associated with the first RS resource set with a value of 0.

In one embodiment, a second condition set comprises BFI_COUNTER associated with the second RS resource set with a value of 0.

In one embodiment, a value of at least one of the third evaluation period or the fourth evaluation period is related to whether beam failure based on the first RS resource set occurs; when no beam failure occurs, the third evaluation period is equal to the first evaluation period, and the fourth evaluation period is equal to the second evaluation period.

In one subembodiment of the above embodiment, the meaning of the phrase of not occurring beam failure is: a radio link targeted or determined by the first RS resource set is occurring beam failure.

In one subembodiment of the above embodiment, the meaning of the phrase of not occurring beam failure is: a radio link targeted or determined by the second RS resource set is occurring beam failure.

In one subembodiment of the above embodiment, the meaning of the phrase of not occurring beam failure is: a radio link targeted or determined by the first RS resource set is occurring beam failure; a radio link targeted or determined by the second RS resource set is occurring beam failure.

In one subembodiment of the above embodiment, a value of the third evaluation period is related to whether beam failure based on the first RS resource set occurs.

In one subembodiment of the above embodiment, when a radio link according to the first RS resource set has beam failure, a value during the third evaluation period is different from a value during the third evaluation period when a radio link according to the first RS resource set has no beam failure.

In one subembodiment of the above embodiment, when a radio link according to the first RS resource set has beam failure, a value during the third evaluation period is greater than a value during the third evaluation period when a radio link of the first RS resource set has no beam failure.

In one subembodiment of the above embodiment, when a radio link according to the first RS resource set has beam failure, a value during the third evaluation period is less than a value during the third evaluation period when a radio link according to the first RS resource set has no beam failure.

In one subembodiment of the above embodiment, when a radio link according to the first RS resource set has beam failure, a value during the fourth evaluation period is different from a value during the fourth evaluation period when radio link according to the first RS resource set has no beam failure.

In one subembodiment of the above embodiment, when a radio link according to the first RS resource set has beam failure, a value during the fourth evaluation period is greater than a value during the fourth evaluation period when radio link according to the first RS resource set has no beam failure.

In one subembodiment of the above embodiment, when a radio link according to the first RS resource set has beam failure, a value during the fourth evaluation period is less than a value during the fourth evaluation period when radio link according to the first RS resource set has no beam failure.

In one embodiment, a value of at least one of the third evaluation period or the fourth evaluation period is related to whether beam failure based on the second RS resource set occurs; when no beam failure occurs, the third evaluation period is equal to the first evaluation period, and the fourth evaluation period is equal to the second evaluation period.

In one subembodiment of the above embodiment, when a radio link based on the second RS resource set has beam failure, a value during the third evaluation period is greater than a value during the third evaluation period when radio link based on the second RS resource set has no beam failure.

In one subembodiment of the above embodiment, when a radio link based on the second RS resource set has beam failure, a value during the third evaluation period is less than a value during the third evaluation period when radio link based on the second RS resource set has no beam failure.

In one subembodiment of the above embodiment, a value of the fourth evaluation period is related to whether beam failure based on the first RS resource set occurs.

In one subembodiment of the above embodiment, when a radio link based on the second RS resource set has beam failure, a value during the fourth evaluation period is greater than a value during the fourth evaluation period when radio link based on the second RS resource set has no beam failure.

In one subembodiment of the above embodiment, when a radio link based on the second RS resource set has beam failure, a value during the fourth evaluation period is less than a value during the fourth evaluation period when radio link based on the second RS resource set has no beam failure.

In one embodiment, the meaning of the phrase that the third evaluation period is equal to the first evaluation period comprises: a value during the third evaluation period is equal to a value of the first evaluation period.

In one embodiment, the meaning of the phrase that the fourth evaluation period is equal to the second evaluation period comprises: a value during the fourth evaluation period is equal to a value of the second evaluation period.

In one embodiment, the first condition set and the second condition set respectively comprise that a first timer corresponding to a cell group to which a first serving cell belongs is not running.

In one embodiment, the first PCI is a PCI of the first serving cell.

In one embodiment, the first signaling is used to configure the first serving cell.

In one embodiment, a cell that SpCellConfig comprised in the first signaling used for configuring is the first serving cell, and spCellConfigCommon comprised in SpCellConfig comprised in the first signaling comprises the first PCI.

In one embodiment, a cell that SCellConfig comprised in the first signaling used for configuring is the first serving cell, and sCellConfigCommon comprised in SCellConfig comprised in the first signaling comprises the first PCI.

In one embodiment, a cell group to which the first serving cell belongs is an MCG.

In one embodiment, a cell group to which the first serving cell belongs is an SCG.

In one embodiment, the first timer comprises T310.

In one embodiment, the first timer comprises T316.

In one embodiment, the first timer is used for BWP switching.

In one embodiment, the first timer is used for beam failure recovery.

In one embodiment, the first timer is used for beam failure detection.

In one embodiment, an expiration of the first timer is used to de-activate a serving cell.

In one embodiment, an expiration of the first timer is used to deactivate the first serving cell.

In one embodiment, the first timer is used for switching.

In one embodiment, an expiration of the first timer triggers the first node entering into RRC_IDLE state.

In one embodiment, an expiration of the first timer triggers the first node entering into RRC_INACTIVE state.

In one embodiment, an expiration of the first timer triggers a failure of the first node.

In one embodiment, an expiration of the first timer triggers the first node releasing at least one RS.

In one embodiment, an expiration of the first timer triggers the first node releasing or deactivating at least one RS in the first RS resource set.

In one embodiment, an expiration of the first timer triggers the first node releasing or deactivating at least one RS in the second RS resource set.

In one embodiment, whether the first condition set comprises a condition of a first timer not being running is related to the first PCI.

In one embodiment, when the first PCI is a PCI of an SpCell, the first condition set comprises a condition that a first timer is not running, when the first PCI is a PCI of an SCell, the first condition set does not comprise the condition that a first timer is not running.

In one embodiment, when the first PCI is a PCI of an SpCell, the first condition set does not comprise a condition that a first timer is not running, when the first PCI is a PCI of an SCell, the first condition set comprises the condition that a first timer is not running.

In one embodiment, when the first PCI is a PCI of the first serving cell, the first condition set comprises a condition that the first timer is not running, and when the first PCI is not a PCI of the first serving cell, the first condition set does not comprise a condition that the first timer is not running.

In one embodiment, only one of the first condition set and the second condition set comprises a condition of the first timer not being running.

In one embodiment, the first condition set comprises a condition that the first timer is not running, and the second condition set does not comprise a condition that the first timer is not running.

In one embodiment, the first condition set does not comprise a condition that the first timer is not running, and the second condition set comprises a condition that the first timer is not running.

In one embodiment, only one of the first condition set and the second condition set comprises the condition that a T310 timer corresponding to a cell group to which the first serving cell belongs is not triggered; whether the first condition set comprises a condition that a T310 timer corresponding to a cell group to which the first service cell belongs is not triggered or the second condition set comprises the condition that a T310 timer corresponding to a cell group to which the first serving cell belongs is not triggered is related to the first PCI and the second PCI.

In one embodiment, the first condition set comprises that a T310 timer corresponding to a cell group to which the first serving cell belongs is not triggered; the second condition set is unrelated to whether a T310 timer corresponding to a cell group to which the first service cell belongs is triggered; the first PCI is indicated by a physCellId comprised in ServingCellConfigCommon comprised in the first signaling; the second PCI is indicated by an additionalPCI field comprised in the first signaling.

In one embodiment, at least one RS resource in the first RS resource set is used for RLM.

In one embodiment, at least one RS resource in the second RS resource set is used for RLM.

In one embodiment, RS resources in the second RS resource set are not used for RLM.

In one embodiment, RS resources in the second RS resource set are only used for BFD.

In one embodiment, the first evaluation period, the second evaluation period, the third evaluation period, and the fourth evaluation period refer to a length of time rather than a specific time-domain resource.

Embodiment 2

Figure 2:
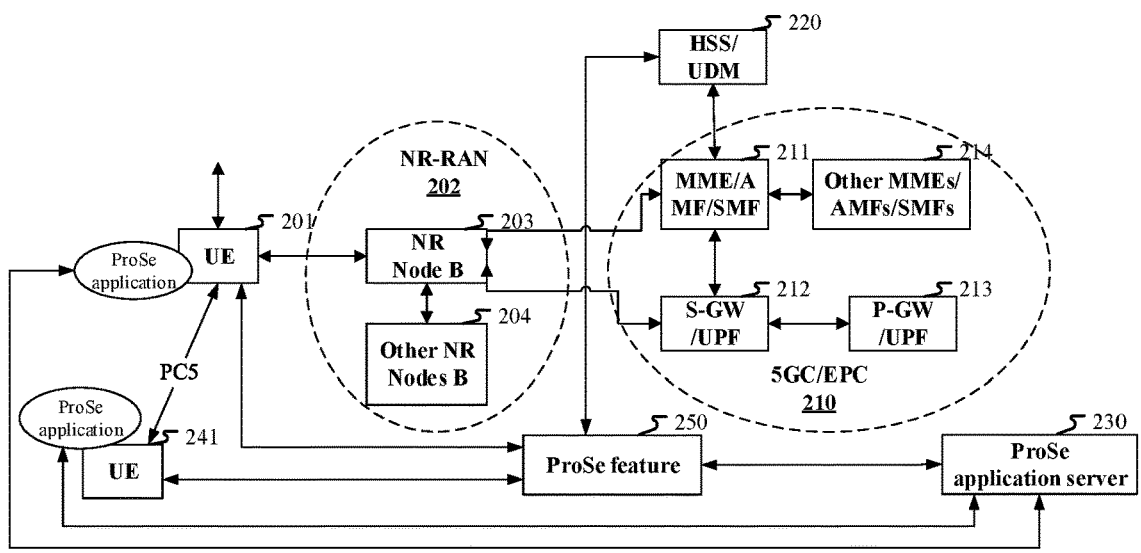
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Tenn Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called abase station, abase transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present application is a UE 201.

In one embodiment, a base station of the second node in the present application is a gNB 203.

In one embodiment, a radio link between the UE 201 and NR node B is an uplink.

In one embodiment, a radio link between NR node B and UE 201 is a downlink.

In one embodiment, the UE 201 supports relay transmission.

In one embodiment, the UE 201 comprises a mobile phone.

In one embodiment, the UE 201 is a vehicle comprising a car.

In one embodiment, the gNB 203 is a MarcoCellular base station.

In one embodiment, the gNB 203 is a Micro Cell base station.

In one embodiment, the gNB 203 is a Pico Cell base station.

In one embodiment, the gNB 203 is a flight platform.

In one embodiment, the gNB 203 is satellite equipment.

Embodiment 3

Figure 3:
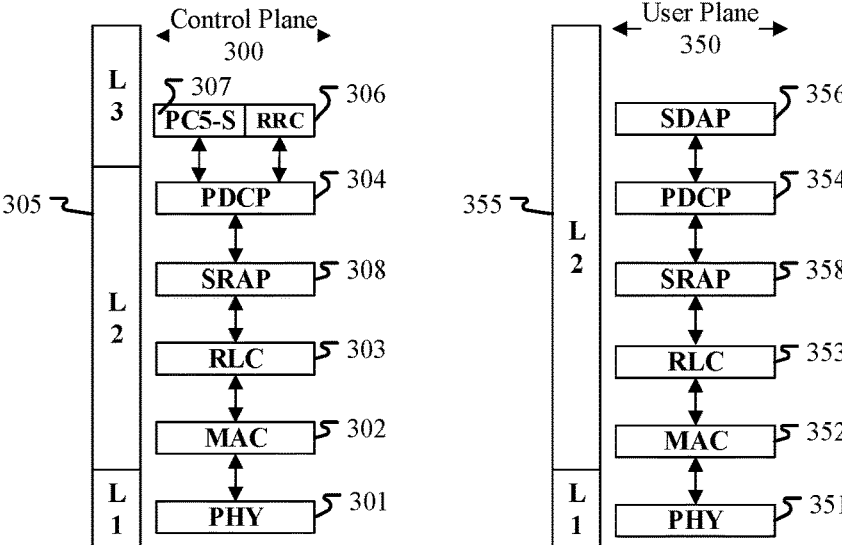
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. PC5 Signaling Protocol (PC5-S) sublayer 307 is responsible for the processing of signaling protocol at PC5 interface. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. SRB can be seen as a service or interface provided by the PDCP layer to a higher layer, such as the RRC layer. In NR system, SRB comprises SRB1, SRB2, SRB3, and when it comes to sidelink communications, there is also SRB4, which is respectively used to transmit different types of control signalings. SRB, a bearer between a UE and access network, is used to transmit a control signaling, comprising an RRC signaling, between UE and access network. SRB1 has special significance for a UE. After each UE establishes an RRC connection, there will be SRB1 used to transmit RRC signaling. Most of the signalings are transmitted through SRB1. If SRB1 is interrupted or unavailable, the UE must perform RRC reconstruction. SRB2 is generally used only to transmit an NAS signaling or signaling related to security aspects. UE cannot configure SRB3. Except for emergency services, a UE must establish an RRC connection with the network for subsequent communications. Although not described in the figure, the first node may comprise several higher layers above the L2 305. also comprises a network layer (i.e., IP layer) terminated at a P-GW 213 of the network side and an application layer terminated at the other side of the connection (i.e., a peer UE, a server, etc.). For UE involving relay service, its control plane can also comprise the adaptation sub-layer Sidelink Relay Adaptation Protocol (SRAP) 308, and its user plane can also comprise the adaptation sub-layer SRAP 358, the introduction of the adaptation layer helps lower layers, such as MAC layer, RLC layer, to multiplex and/or distinguish data from multiple source UEs. For nodes that do not involve relay communications, PC5-S307, SRAP 308 and SRAP 358 are not required in the communication process.

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the RRC 306.

In one embodiment, the first message in the present application is generated by the RRC 306.

Embodiment 4

Figure 4:
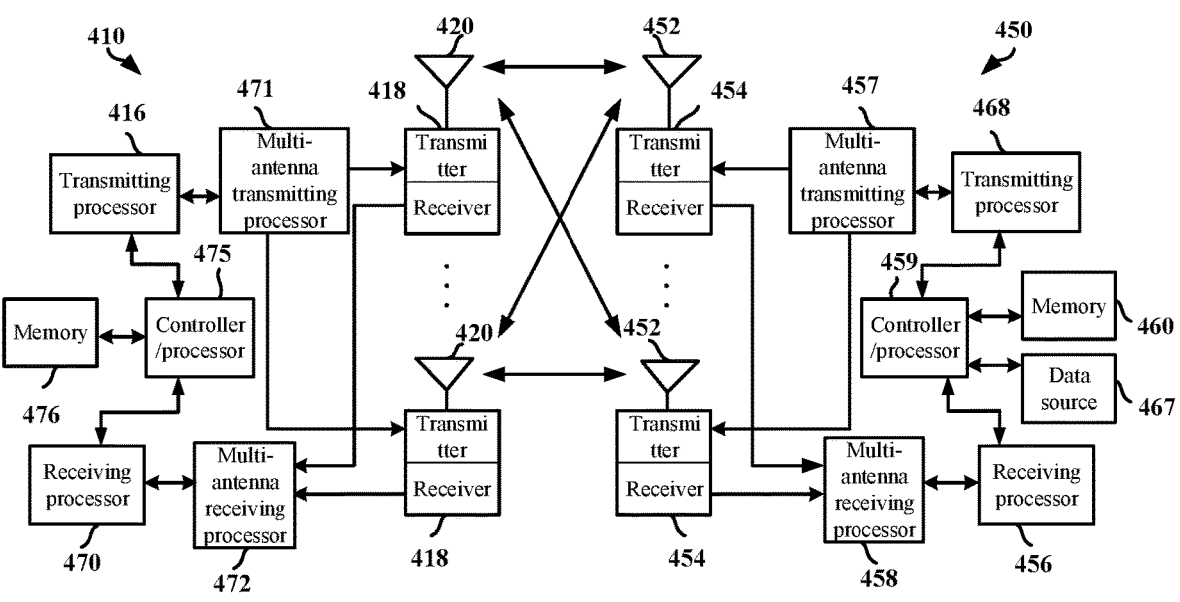
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, optionally may also comprise a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, optional can also comprise a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multiantenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor

459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first signaling, the first signaling indicates a first RS resource set and a second RS resource set; executes a first link quality evaluation for a first BWP based on a first RS resource set; executes a second link quality evaluation for a first BWP according to the second RS resource set; herein, the first RS resource set and the second RS resource set are respectively associated with a first PCI and a second PCI; a first condition set is used for the first link quality evaluation, when all conditions in a first condition set are met, the first link quality evaluation is completed within a first evaluation period, and when at least one condition in the first condition set is not met, the first link quality evaluation is completed within a second evaluation period; a second condition set is used for the second link quality evaluation, when all conditions in a second condition set are met, the second link quality evaluation is completed within a third evaluation period, and when at least one condition in a second condition set is not met, the second link quality evaluation is completed within a fourth evaluation period; the first condition set comprises RSRP of at least the first RS resource set being greater than a first threshold; the second condition set comprises RSRP of at least the second RS resource set being greater than a second threshold.

In one embodiment, the first communication device 450 comprises at least one processor and at least one memory, a memory that stores a computer readable instruction program. The computer readable instruction program generates an action when executed by at least one processor. The action includes: receiving a first signaling, the first signaling indicating a first RS resource set and a second RS resource set; executing a first link quality evaluation for a first BWP based on a first RS resource set; executing a second link quality evaluation for a first BWP according to the second RS resource set; herein, the first RS resource set and the second RS resource set are respectively associated with a first PCI and a second PCI; a first condition set is used for the first link quality evaluation, when all conditions in a first condition set are met, the first link quality evaluation is completed within a first evaluation period, and when at least one condition in the first condition set is not met, the first link quality evaluation is completed within a second evaluation period; a second condition set is used for the second link quality evaluation, when all conditions in a second condition set are met, the second link quality evaluation is completed within a third evaluation period, and when at least one condition in a second condition set is not met, the second link quality evaluation is completed within a fourth evaluation period; the first condition set comprises RSRP of at least the first RS resource set being greater than a first threshold; the second condition set comprises RSRP of at least the second RS resource set being greater than a second threshold.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a vehicle terminal.

In one embodiment, the second communication device 450 is a relay.

In one embodiment, the second communication device 410 is a satellite.

In one embodiment, the second communication device 410 is an aircraft.

In one embodiment, the second communication device 410 is a base station.

In one embodiment, the receiver 454 (comprising the antenna 452), the receiving processor 456 and the controller/processor 459 are used to receive the first signaling in the present application.

In one embodiment, the transmitter 454 (comprising antenna 452), the transmitting processor 468 and the controller/processor 459 are used to transmit the first message in the present application.

Embodiment 5

Figure 5:
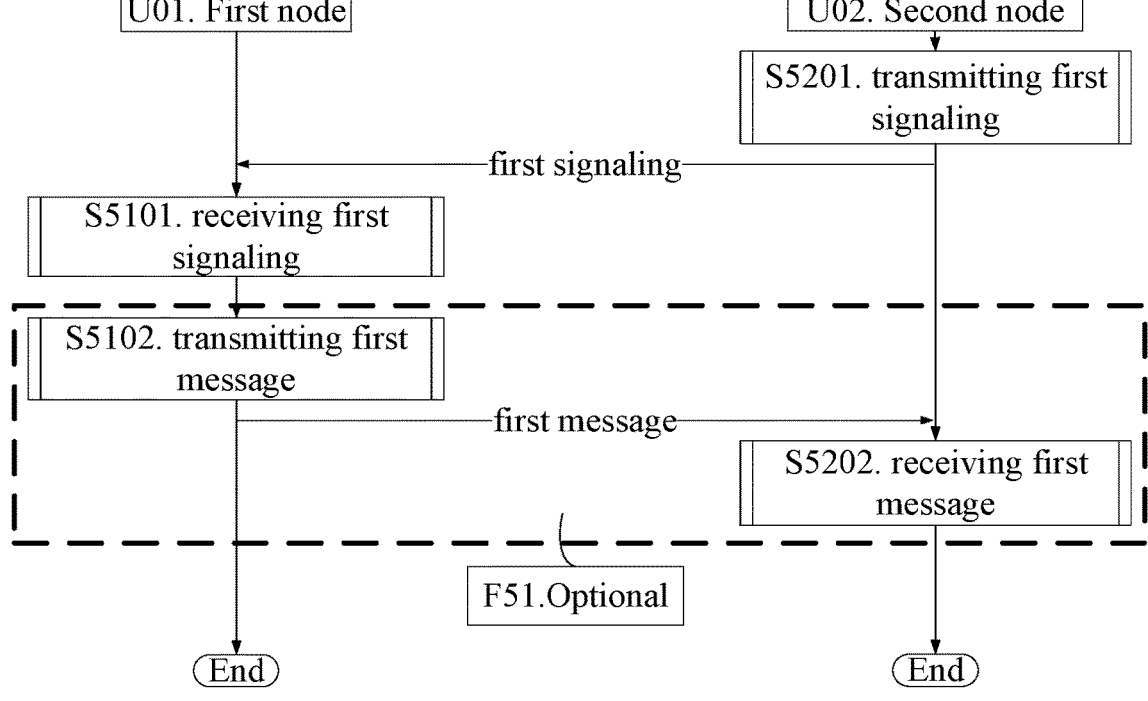
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, U01 corresponds to a first node in the present application. It is particularly underlined that the order illustrated in the embodiment does not put constraints over sequences of signal transmissions and implementations and steps in F51 are optional.

The first node U01 receives a first signaling in step S5101; transmits a first message in step S5102;

The second node U02 transmits a first signaling in step S5201; receives a first message in step S5202.

In embodiment 5, the first signaling indicates a first RS resource set and a second RS resource set;

herein, the first RS resource set and the second RS resource set are respectively associated with a first PCI and a second PCI; the first condition set is used for a first link quality evaluation, when all conditions in a first condition set are met, the first link quality evaluation is completed within a first evaluation period, and when at least one condition in the first condition set is not met, the first link quality evaluation is completed within a second evaluation period; a second condition set is used for a second link quality evaluation, when all conditions in a second condition set are met, the second link quality evaluation is completed within a third evaluation period, and when at least one condition in a second condition set is not met, the second link quality evaluation is completed within a fourth evaluation period; the first condition set comprises RSRP of at least the first RS resource set being greater than a first threshold; the second condition set comprises RSRP of at least the second RS resource set being greater than a second threshold.

In one embodiment, the first node U01 executes a first link quality evaluation for a first BWP based on a first RS resource set.

In one embodiment, the first node U01 executes a second link quality evaluation for a first BWP based on a second RS resource set.

In one embodiment, the first node U01 is a UE, and the second node U02 is a serving cell or a cell group of the first node U01.

In one embodiment, the first node U01 is a UE, and the second node U02 is a base station serving the first node U01.

In one embodiment, the first node transmits the first signaling through downlink.

In one embodiment, the second node U02 is an MN of the first cell group.

In one embodiment, the second node U02 is a PCell.

In one embodiment, the second node U02 is a PSCell.

In one embodiment, the second node U02 is a first serving cell.

In one embodiment, the second node U02 is a cell group to which a first serving cell belongs.

In one embodiment, the first signaling is transmitted through a downlink channel.

In one embodiment, the target signaling is an RRC message.

In one embodiment, the first signaling comprises multiple RRC messages.

In one embodiment, the first signaling is transmitted via sidelink.

In one embodiment, the first signaling is transmitted via main sidelink.

In one embodiment, the first signaling only comprises two reference signal resource sets used for failure detection.

In one embodiment, the first signaling only comprises two reference signal resource sets used for beam failure detection.

In one embodiment, the first message is transmitted via an uplink.

In one embodiment, the first message is transmitted through a sidelink.

In one embodiment, the first message comprises an RRC message.

In one embodiment, the first message comprises a NAS message.

In one embodiment, the first message is a UEAssistanceInformation message.

In one embodiment, the first message comprises at least partial fields in UEAssistanceInformation.

In one embodiment, the first message comprises a first bitmap and a second bitmap.

In one embodiment, at least one bit in the first bitmap is used to indicate whether the first link quality evaluation is completed within the first evaluation period or the second evaluation period.

In one embodiment, at least a bit in the second bitmap is used to indicate whether the second link quality evaluation is completed within the third evaluation period or fourth evaluation period.

In one embodiment, a first bitmap and a second bit are used together to indicate whether the first link quality evaluation is completed within the first evaluation period or the second evaluation period.

In one embodiment, the first bitmap and the second bit are used together to indicate whether the second link quality evaluation is completed within the third evaluation period or the fourth evaluation period.

In one embodiment, the first bitmap and the second bitmap are composed of different bits in a bitmap.

In one embodiment, the first bitmap and the second bitmap are respectively carried by different fields of the first message.

In one embodiment, the first bitmap and the second bitmap are respectively carried by a same field of the first message.

In one embodiment, the first signaling indicates a third resource set.

In one embodiment, the third RS resource set is specific to the first serving cell.

In one embodiment, the first signaling indicates the third RS resource set, and the third RS resource set is used for a beam failure detection for the first serving cell.

In one embodiment, the first message comprises a third bitmap only assuming that the first RS resource set and the second RS resource set are not configured.

In one embodiment, bits corresponding to the first serving cell in the third bitmap are used to indicate the target evaluation period.

In one embodiment, a FailureDetectionResourcesToAddModList field in RadioLinkMonitoringConfig comprised in the first signaling indicates the third RS resource set.

In one embodiment, the third RS resource set is an RS resource set with a destination of beamFailure indicated by a failureDetectionResourcesToAddModList field in RadioLinkMonitoringConfig comprised in the first signaling.

In one embodiment, the first signaling indicates the third RS resource set by indicating a reference signal resource index.

In one embodiment, the first signaling indicates the first RS resource set by indicating a reference signal resource index.

In one embodiment, the first signaling indicates the second RS resource set by indicating a reference signal resource index.

In one embodiment, the target evaluation period is equal to one of the first evaluation period and the second evaluation period.

In one embodiment, the target evaluation period is equal to one of the third evaluation period and the fourth evaluation period.

In one embodiment, the meaning of the phrase that the third RS resource set is used for a beam failure detection for the first serving cell comprises: a servingcellconfig cell or a servingcellconfigcommon cell used to configure the first serving cell indicates the third RS resource set.

In one embodiment, the meaning of the phrase that the third RS resource set is used for a beam failure detection for the first serving cell comprises: the third RS resource set is specific to a first BWP of the first serving cell.

In one embodiment, the third RS resource set is go.

In one embodiment, RS resources comprised in the first RS resource set are periodic.

In one embodiment, RS resources comprised in the second RS resource set are periodic.

In one embodiment, RS resources comprised in the third RS resource set are periodic.

In one embodiment, the meaning of the phrase that the first message comprises a third bitmap only assuming that the first RS resource set and the second RS resource set are not configured comprises: when the first node is configured with the first RS resource set and the second RS resource set, the first message does not comprise the third bitmap.

In one embodiment, a bfd-MeasRelaxationState field of the first message comprises the third bitmap.

In one embodiment, a bfd-MeasRelaxationState field of the first message comprises the first bitmap.

In one embodiment, a bfd-MeasRelaxationState field of the first message comprises the second bitmap.

In one embodiment, a bfd-MeasRelaxationState1 field of the first message comprises the first bitmap.

In one embodiment, a bfd-MeasRelaxationState2 field of the first message comprises the second bitmap.

In one embodiment, the first node, completes a link quality evaluation for a third RS resource set during a target evaluation period.

In one embodiment, the first node transmits a first message.

In one embodiment, link quality evaluation for a third RS resource set will not trigger a beam failure recovery.

In one embodiment, link quality evaluation for a first RS resource set can trigger a beam failure recovery.

In one embodiment, link quality evaluation for a second RS resource set can trigger a beam failure recovery.

In one embodiment, a third condition set is used for a link quality evaluation for a third RS resource set, when all conditions in a third condition set are satisfied, a link quality evaluation of the third RS resource set is completed within a first evaluation period, when at least one condition in a third condition set is not satisfied, a link quality evaluation for a third RS resource set is completed within a second evaluation period.

In one embodiment, the third condition set comprises RSRP of at least the third RS resource set being greater than a third threshold.

In one embodiment, the third condition set comprises RSRP of at least the third RS resource set being greater than a first threshold.

In one embodiment, the first threshold is equal to the second threshold.

In one embodiment, the first threshold is equal to the third threshold.

In one embodiment, the second node U02 configures the third threshold.

In one embodiment, the second node U02 configures the first threshold and the second threshold.

In one embodiment, the meaning of the phrase of a link quality evaluation for a third RS resource set comprises: evaluating quality of a link to which or for which the third RS resource set belongs or targets.

In one embodiment, the meaning of the phrase of a link quality evaluation for a third RS resource set comprises: the third RS resource set is used for a link quality evaluation.

In one embodiment, the meaning of the phrase of a link quality evaluation for a third RS resource set comprises: the third RS resource set is used for a link quality evaluation, and a link evaluated by the third RS resource set is a link of the third RS resource set.

In one embodiment, the meaning of the phrase of a link quality evaluation for a third RS resource set comprises: the third RS resource set is used for a beam failure detection.

Embodiment 6

Embodiment 6 illustrates a schematic diagram of a reference signal according to one embodiment of the present application, as shown in FIG. 6.

601 and 602 in FIG. 6 are all represented by ellipses, representing transmissions determined by different transmission parameters.

In one embodiment, the second node and the third node belong to different serving cells and are associated with different PCIs.

In one embodiment, the second node is the first serving cell.

In one embodiment, a PCI of the second node is the first PCI.

In one embodiment, a PCI of the third node is the second PCI.

In one embodiment, 601 and 602 are different beams.

In one embodiment, 601 is a first beam; 602 is a second beam.

In one embodiment, 601 and 602 are different TRPs.

In one embodiment, 601 is a first TRP, 602 is a second TRP.

In one embodiment, 601 corresponds to a first parameter group; 602 corresponds to a second parameter group.

In one subembodiment of the embodiment, the first parameter group is a group of spatial parameters; the second parameter group is a group of spatial parameters.

In one embodiment, 601 is or corresponds to a first RS resource set; 602 is or corresponds to a second RS resource set.

In one embodiment, 601 and 602 are determined by different reference signals.

In one embodiment, the first link quality evaluation is used to evaluate whether 601 has beam failure.

In one embodiment, the second link quality evaluation is used to evaluate whether 602 has beam failure.

In one embodiment, a link targeted for the first link quality evaluation and a link targeted for the second link quality evaluation are both radio links.

In one embodiment, a link targeted by the first link quality evaluation and a link targeted by the second link quality evaluation are mapped to a same radio bearer.

In one embodiment, whether a completion of the second link quality evaluation during a third evaluation period or a fourth evaluation period is related to whether beam failure occurs at 601.

In one embodiment, whether a completion of the first link quality evaluation within a first evaluation period or a second evaluation period is related to whether beam failure occurs at 602.

In one embodiment, reference signal resources used to evaluate radio link failure only have a quasi co-located relation with the first RS resource set.

In one embodiment, reference signal resources used to evaluate radio link failure belong to the first RS resource set.

In one embodiment, the first condition set comprises that the first timer is not in a running state.

In one embodiment, the second condition set does not comprise that the first timer is not in a running state.

Embodiment 7

Embodiment 7 illustrates a schematic diagram of a bit in a first bitmap being used to indicate whether a first link quality evaluation is completed within a first evaluation period or within a second evaluation period according to one embodiment of the present application, as shown in FIG. 7.

In one embodiment, a (servCellIndex+1)-th bit in the first bitmap is mapped to a serving cell with servCellIndex as a serving cell index.

In one embodiment, a (servCellIndex+1)-th bit in the first bitmap is used to indicate a link evaluated by RS resources associated with the first PCI of a serving cell with servCellIndex as a serving cell index.

In one embodiment, a (servCellIndex+1)-th bit in the first bitmap is used to indicate an evaluation period of a link evaluated by the first RS resource set of a serving cell with a serving cell index of servCellIndex.

In one embodiment, a serving cell index of the first serving cell is servCellIndex.

In one embodiment, a (servCellIndex+1)-th bit in the first bitmap is used to indicate whether a first link quality evaluation is completed within a first evaluation period or a second evaluation period.

In one embodiment, the meaning of the phrase that a bit in a first bitmap is used to indicate whether a first link quality evaluation is completed within a first evaluation period or within a second evaluation period comprises: the bit in the first bitmap is used to indicate whether BFD measurement relaxation is adopted, when BFD measurement relaxation is adopted, the first link quality evaluation is completed within the first evaluation period; when BFD measurement is not adopted, the first link quality evaluation is completed within the second evaluation period.

In one embodiment, a (servCellIndex+1)-th bit in the second bitmap is mapped to a serving cell with servCellIndex as a serving cell index.

In one embodiment, each bit in the first bitmap corresponds to a serving cell of a cell.

In one embodiment, each bit in the first bitmap corresponds to a serving cell associated with the first PCI.

In one embodiment, each bit in the first bitmap corresponds to a reference signal resource set used for BFD in a serving cell.

In one embodiment, a mapping relation between the first bitmap and a reference signal set starts from MSB.

In one embodiment, a mapping relation between the first bitmap and a serving cell starts from MSB.

In one embodiment, a bit in the first bitmap is set to 1, which indicates that the first link quality evaluation is completed within the first evaluation period.

In one embodiment, a bit in the first bitmap is set to 0, which indicates that the first link quality evaluation is completed within the second evaluation period.

In one embodiment, a bit in the first bitmap is set to 1, which indicates that the first link quality evaluation is completed within the first evaluation period, which simultaneously indicates that the second link quality evaluation is completed within the third evaluation period.

In one embodiment, a bit in the first bitmap is set to 1, which indicates that at least one of the first link quality evaluation and the second link quality evaluation uses BFD measurement relaxation.

In one embodiment, a bit in the first bitmap is set to 1, which indicates that both the first link quality evaluation and the second link quality evaluation uses BFD measurement relaxation.

In one embodiment, the first link quality evaluation is based on any link quality evaluation of the first RS resource set.

In one embodiment, the second link quality evaluation is based on any link quality evaluation of the second RS resource set.

In one embodiment, the first evaluation period is time requirement for the first link quality evaluation when BFD measurement relaxation is adopted.

In one embodiment, the first evaluation period is an evaluation period for the first link quality evaluation when BFD measurement relaxation is adopted.

In one embodiment, the second evaluation period is time requirement for the first link quality evaluation when BFD measurement relaxation is not adopted.

In one embodiment, the second evaluation period is an evaluation period for the first link quality evaluation when BFD measurement relaxation is not adopted.

Embodiment 8

Embodiment 8 illustrates a schematic diagram of a bit in the second bitmap being used to indicate whether a second link quality evaluation is completed within a third evaluation period or a fourth evaluation period according to one embodiment of the present application, as shown in FIG. 8.

In one embodiment, a (servCellIndex+1)-th bit in the second bitmap is used to indicate a link evaluated by RS resources associated with the second PCI of a serving cell with a serving cell index of servCellIndex.

In one embodiment, a (servCellIndex+1)-th bit in the second bitmap is used to indicate an evaluation period of a link evaluated by the second RS resource set of a serving cell with a serving cell index of servCellIndex.

In one embodiment, a serving cell index of the first serving cell is servCellIndex.

In one embodiment, a (servCellIndex+1)-th bit in the second bitmap is used to indicate whether a second link quality evaluation is completed within a third evaluation period or a fourth evaluation period.

In one embodiment, the meaning of the phrase that a bit in the second bitmap is used to indicate whether a second link quality evaluation is completed within a third evaluation period or a fourth evaluation period comprises: the bit in the second bitmap is used to indicate whether BFD measurement relaxation is adopted, when BFD measurement relaxation is adopted, the second link quality evaluation is completed within the third evaluation period; when BFD measurement is not adopted, the second link quality evaluation is completed within the fourth evaluation period.

In one embodiment, a (servCellIndex+1)-th bit in the second bitmap is mapped to a serving cell with servCellIndex as a serving cell index.

In one embodiment, each bit in the second bitmap corresponds to a serving cell of a cell.

In one embodiment, each bit in the second bitmap corresponds to a serving cell associated with the second PCI.

In one embodiment, each bit in the second bitmap corresponds to a reference signal resource set used for BFD in a serving cell.

In one embodiment, a mapping relation between the second bitmap and a reference signal set starts from MSB.

In one embodiment, a mapping relation between the second bitmap and a serving cell starts from MSB.

In one embodiment, a bit in the second bitmap is set to 1, which indicates that the second link quality evaluation is completed within the third evaluation period.

In one embodiment, a bit in the second bitmap is set to 0, which indicates that the second link quality evaluation is completed within the fourth evaluation period.

In one embodiment, the third evaluation period is time requirement for the second link quality evaluation when BFD measurement relaxation is adopted.

In one embodiment, the third evaluation period is an evaluation period for the second link quality evaluation when BFD measurement relaxation is adopted.

In one embodiment, the fourth evaluation period is time requirement for the second link quality evaluation when BFD measurement relaxation is not adopted.

In one embodiment, the fourth evaluation period is an evaluation period for the second link quality evaluation when BFD measurement relaxation is not adopted.

Embodiment 9

Embodiment 9 illustrates a schematic diagram of bits corresponding to a first serving cell in a third bitmap being used to indicate a target evaluation period according to one embodiment of the present application, as shown in FIG. 9.

In one embodiment, the first message transmitted by the first node comprises the third bitmap.

In one embodiment, bfd-MeasRelaxationState in a first message transmitted by the first node comprises the third bitmap.

In one embodiment, any serving cell of a cell group of the first node is mapped to a bit in the third bitmap.

In one subembodiment of the above embodiment, the mapping relation starts from an MSB of the third bitmap.

In one embodiment, a serving cell with a serving cell index of servCellIndex is mapped to a (servCellIndex+1)-th bit in the third bitmap.

In one embodiment, a bit corresponding to a first serving cell in the third bitmap is a third bit, the third bit is a (servCellIndex+1)-th bit starting from MSB in the third bitmap, and a serving cell index of the first serving cell is servCellIndex.

In one embodiment, the third bit is 1, which is used to indicate that the target evaluation period is the first evaluation period.

In one embodiment, the third bit is 0, which is used to indicate that the target evaluation period is the second evaluation period.

In one embodiment, the target evaluation period is a period of time.

In one embodiment, the target evaluation period comprises X millisecond(s), where X is a non-zero real number.

In one embodiment, the target evaluation period comprises Y DRX cycle(s), where Y is a positive integer.

In one embodiment, the third bit is 1, which is used to indicate that BFD measurement relaxation is adopted to complete a link quality evaluation for a third RS resource set for a first BWP; when BFD measurement relaxation is adopted, the target evaluation period is equal to the first evaluation period In one embodiment, the third bit is 0, which is used to indicate that BFD measurement relaxation is not adopted to complete a link quality evaluation for a third RS resource set for a first BWP; when BFD measurement relaxation is not used, the target evaluation period is equal to the second evaluation period

Embodiment 10

Embodiment 10 illustrates a structure block diagram of a processor in a first node according to one embodiment of the present application, as shown in FIG. 10. In FIG. 10, a processor 1000 in a first node comprises a first receiver 1001 and a first transmitter 1002. In Embodiment 10, the first receiver 1001 receives a first signaling, the first signaling indicates a first RS resource set and a second RS resource set;

the first receiver 1001 executes a first link quality evaluation for a first BWP according to the first RS resource set; executes a second link quality evaluation for a first BWP according to the second RS resource set;

herein, the first RS resource set and the second RS resource set are respectively associated with a first PCI and a second PCI; a first condition set is used for the first link quality evaluation, when all conditions in a first condition set are met, the first link quality evaluation is completed within a first evaluation period, and when at least one condition in the first condition set is not met, the first link quality evaluation is completed within a second evaluation period; a second condition set is used for the second link quality evaluation, when all conditions in a second condition set are met, the second link quality evaluation is completed within a third evaluation period, and when at least one condition in a second condition set is not met, the second link quality evaluation is completed within a fourth evaluation period; the first condition set comprises RSRP of at least the first RS resource set being greater than a first threshold; the second condition set comprises RSRP of at least the second RS resource set being greater than a second threshold.

In one embodiment, the first signaling is used to configure a first serving cell;

herein, the meaning of the phrase that the first signaling is used to configure a first serving cell comprises: the first serving cell is an SpCell, and an SpCellConfig field comprised in the first signaling is used to configure the first serving cell; the SpCellConfig field of the first signaling comprises the first PCI and the second PCI, or the first serving cell is an SCell, and an SCellConfig field comprised the first signaling comprises the first PCI and the second PCI; the first PCI is a PCI of the first serving cell; the second PCI is an additional PCI; there exists a mapping relation between only a former of the first PCI and the second PCI and a synchronization signal of the first serving cell.

In one embodiment, the first condition set comprises not transmitting a beam failure instance indication based on the first RS resource set to higher layer; the first condition set is unrelated to whether to transmit a beam failure instance indication based on the second RS resource set to higher layer; the second condition set comprises not transmitting a beam failure instance indication based on the second RS resource set to higher layer; the second condition set is unrelated to whether to transmit a beam failure instance indication based on the first RS resource set to higher layer.

In one embodiment, the first condition set comprises not transmitting a beam failure instance indication based on the first RS resource set or based on the second RS resource set to higher layer; the second condition set comprises not transmitting a beam failure instance indication based on the first RS resource set or based on the second RS resource set to higher layer.

In one embodiment, a value of at least one of the third evaluation period or the fourth evaluation period is related to whether beam failure based on the first RS resource set occurs; when no beam failure occurs, the third evaluation period is equal to the first evaluation period, and the fourth evaluation period is equal to the second evaluation period.

In one embodiment, the first condition set and the second condition set respectively comprise that a first timer corresponding to a cell group to which a first serving cell belongs is not running.

In one embodiment, whether the first condition set comprises a condition of a first timer not being running is related to the first PCI.

In one embodiment, only one of the first condition set and the second condition set comprises a condition of the first timer not being running.

In one embodiment, the first transmitter 1022 transmits a first message, the first message comprises a first bitmap and a second bitmap, one bit in the first bitmap is used to indicate whether the first link quality evaluation is completed within the first evaluation period or the second evaluation period; a bit in the second bitmap is used to indicate whether the second link quality evaluation is completed within the third evaluation period or fourth evaluation period.

The first receiver 1001 completes a link quality evaluation for a third RS resource set for a first BWP within a target evaluation period;

the first transmitter 1002 transmits a first message;

herein, the first signaling indicates the third RS resource set, and the third RS resource set is used for a beam failure detection for the first serving cell; the first message comprises a third bitmap only assuming that the first RS resource set and the second RS resource set are not configured; bits corresponding to the first serving cell in the third bitmap are used to indicate the target evaluation period.

In one embodiment, the first node is a UE.

In one embodiment, the first node is a terminal that supports large delay differences.

In one embodiment, the first node is a terminal that supports NTN.

In one embodiment, the first node is an aircraft or vessel.

In one embodiment, the first node is a mobile phone or vehicle terminal.

In one embodiment, the first node is a relay UE and/or U2N remote UE.

In one embodiment, the first node is an Internet of Things terminal or an Industrial Internet of Things terminal.

In one embodiment, the first node is a device that supports transmission with low-latency and high-reliability.

In one embodiment, the first node is a sidelink communication node.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present application includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

This application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:

a first receiver, receiving a first signaling, the first signaling indicating a first Reference Signal (RS) resource set and a second RS resource set; and the first receiver, executing a first link quality evaluation for a first Bandwidth Part (BWP) according to the first RS resource set; executing a second link quality evaluation for a first BWP according to the second RS resource set;

wherein the first RS resource set and the second RS resource set are respectively associated with a first physical cell identity (PCI) and a second PCI; a first condition set is used for the first link quality evaluation, when all conditions in a first condition set are met, the first link quality evaluation is completed within a first evaluation period, and when at least one condition in the first condition set is not met, the first link quality evaluation is completed within a second evaluation period; a second condition set is used for the second link quality evaluation, when all conditions in a second condition set are met, the second link quality evaluation is completed within a third evaluation period, and when at least one condition in a second condition set is not met, the second link quality evaluation is completed within a fourth evaluation period; the first condition set comprises Reference Signal Receiving Power (RSRP) of at least the first RS resource set being greater than a first threshold; the second condition set comprises RSRP of at least the second RS resource set being greater than a second threshold.

2. The first node according to claim 1, wherein the first signaling is used to configure a first serving cell; wherein the meaning of the phrase that the first signaling is used to configure a first serving cell comprises: the first serving cell is a Special Cell (SpCell), and an SpCellConfig field comprised in the first signaling is used to configure the first serving cell; the SpCellConfig field of the first signaling comprises the first PCI and the second PCI, or the first serving cell is a Secondary Cell (SCell), and the SCellConfig field comprised the first signaling comprises the first PCI and the second PCI; the first PCI is a PCI of the first serving cell; the second PCI is an additional PCI; there exists a mapping relation between only a former of the first PCI and the second PCI and a synchronization signal of the first serving cell.

3. The first node according to claim 1, wherein the first condition set comprises not transmitting a beam failure instance indication based on the first RS resource set to higher layer; the first condition set is unrelated to whether to transmit a beam failure instance indication based on the second RS resource set to higher layer; the second condition set comprises not transmitting a beam failure instance indication based on the second RS resource set to higher layer; the second condition set is unrelated to whether to transmit a beam failure instance indication based on the first RS resource set to higher layer.

4. The first node according to claim 2, wherein the first condition set comprises not transmitting a beam failure instance indication based on the first RS resource set to higher layer; the first condition set is unrelated to whether to transmit a beam failure instance indication based on the second RS resource set to higher layer; the second condition set comprises not transmitting a beam failure instance indication based on the second RS resource set to higher layer; the second condition set is unrelated to whether to transmit a beam failure instance indication based on the first RS resource set to higher layer.

5. The first node according to claim 1, wherein the first condition set comprises not transmitting a beam failure instance indication based on the first RS resource set or based on the second RS resource set to higher layer; the second condition set comprises not transmitting a beam failure instance indication based on the first RS resource set or based on the second RS resource set to higher layer.

6. The first node according to claim 2, wherein the first condition set comprises not transmitting a beam failure instance indication based on the first RS resource set or based on the second RS resource set to higher layer; the second condition set comprises not transmitting a beam failure instance indication based on the first RS resource set or based on the second RS resource set to higher layer.

7. The first node according to claim 1, wherein a value of at least one of the third evaluation period or the fourth evaluation period is related to whether beam failure based on the first RS resource set occurs; when no beam failure occurs, the third evaluation period is equal to the first evaluation period, and the fourth evaluation period is equal to the second evaluation period.

8. The first node according to claim 2, wherein a value of at least one of the third evaluation period or the fourth evaluation period is related to whether beam failure based on the first RS resource set occurs; when no beam failure occurs, the third evaluation period is equal to the first evaluation period, and the fourth evaluation period is equal to the second evaluation period.

9. The first node according to claim 1, wherein the first condition set and the second condition set respectively comprise that a first timer corresponding to a cell group to which a first serving cell belongs is not running.

10. The first node according to claim 2, wherein the first condition set and the second condition set respectively comprise that a first timer corresponding to a cell group to which a first serving cell belongs is not running.

11. The first node according to claim 1, wherein whether the first condition set comprises a condition of a first timer not being running is related to the first PCI.

12. The first node according to claim 2, wherein whether the first condition set comprises a condition of a first timer not being running is related to the first PCI.

13. The first node according to claim 11, wherein only one of the first condition set and the second condition set comprises a condition of the first timer not being running.

14. The first node according to claim 12, wherein only one of the first condition set and the second condition set comprises a condition of the first timer not being running.

15. The first node according to claim 1, comprising:

a first transmitter, transmitting a first message, the first message comprising a first bitmap and a second bitmap, a bit in the first bitmap being used to indicate whether the first link quality evaluation is completed within the first evaluation period or the second evaluation period; a bit in the second bitmap is used to indicate whether the second link quality evaluation is completed within the third evaluation period or fourth evaluation period.

16. The first node according to claim 2, comprising:

a first transmitter, transmitting a first message, the first message comprising a first bitmap and a second bitmap, a bit in the first bitmap being used to indicate whether the first link quality evaluation is completed within the first evaluation period or the second evaluation period; a bit in the second bitmap is used to indicate whether the second link quality evaluation is completed within the third evaluation period or fourth evaluation period.

17. The first node according to claim 1, comprising:

the first receiver, completing a link quality evaluation for a third RS resource set for a first BWP within a target evaluation period; and a first transmitter, transmitting a first message;

wherein the first signaling indicates the third RS resource set, and the third RS resource set is used for a beam failure detection for a first serving cell; the first message comprises a third bitmap only assuming that the first RS resource set and the second RS resource set are not configured; bits corresponding to the first serving cell in the third bitmap are used to indicate the target evaluation period.

18. The first node according to claim 2, comprising:

the first receiver, completing a link quality evaluation for a third RS resource set for a first BWP within a target evaluation period; and a first transmitter, transmitting a first message;

wherein the first signaling indicates the third RS resource set, and the third RS resource set is used for a beam failure detection for the first serving cell; the first message comprises a third bitmap only assuming that the first RS resource set and the second RS resource set are not configured; bits corresponding to the first serving cell in the third bitmap are used to indicate the target evaluation period.

19. The first node according to claim 1, wherein the first evaluation period is an evaluation period of the first link quality evaluation when beam failure detection (BFD) measurement relaxation is adopted, and the second evaluation period is an evaluation period for the first link quality evaluation when BFD measurement relaxation is not used.

20. A method in a first node for wireless communications, comprising:

receiving a first signaling, the first signaling indicating a first RS resource set and a second RS resource set; and executing a first link quality evaluation for a first BWP according to the first RS resource set; executing a second link quality evaluation for a first BWP according to the second RS resource set;

wherein the first RS resource set and the second RS resource set are respectively associated with a first PCI and a second PCI; a first condition set is used for the first link quality evaluation, when all conditions in a first condition set are met, the first link quality evaluation is completed within a first evaluation period, and when at least one condition in the first condition set is not met, the first link quality evaluation is completed within a second evaluation period; a second condition set is used for the second link quality evaluation, when all conditions in a second condition set are met, the second link quality evaluation is completed within a third evaluation period, and when at least one condition in a second condition set is not met, the second link quality evaluation is completed within a fourth evaluation period; the first condition set comprises RSRP of at least the first RS resource set being greater than a first threshold; the second condition set comprises RSRP of at least the second RS resource set being greater than a second threshold.

\* \* \* \* \*